US012098570B2

(12) United States Patent
Genova

(10) Patent No.: US 12,098,570 B2
(45) Date of Patent: Sep. 24, 2024

(54) MOVEMENT ASSISTANCE AND STOWAGE DEVICE FOR A SPA COVER

(71) Applicant: Leisure Concepts, Inc., Spokane, WA (US)

(72) Inventor: Michael C. Genova, Spokane, WA (US)

(73) Assignee: Leisure Concepts, Inc., Spokane, WA (US)

( * ) Notice: Subject to any disclaimer, the term of this patent is extended or adjusted under 35 U.S.C. 154(b) by 322 days.

(21) Appl. No.: 17/430,539

(22) PCT Filed: Feb. 12, 2020

(86) PCT No.: PCT/US2020/017876
§ 371 (c)(1),
(2) Date: Aug. 12, 2021

(87) PCT Pub. No.: WO2020/167911
PCT Pub. Date: Aug. 20, 2020

(65) Prior Publication Data

US 2022/0154483 A1 May 19, 2022

Related U.S. Application Data

(60) Provisional application No. 62/806,643, filed on Feb. 15, 2019.

(51) Int. Cl.
*E04H 4/08* (2006.01)
*E05F 15/53* (2015.01)

(52) U.S. Cl.
CPC ............ *E04H 4/084* (2013.01); *E05F 15/53* (2015.01); *E05Y 2201/454* (2013.01); *E05Y 2201/626* (2013.01); *E05Y 2999/00* (2024.05)

(58) Field of Classification Search
CPC ............... E04H 4/084; E05Y 2201/454; E05Y 2201/626; E05Y 2900/60; E05F 15/53
See application file for complete search history.

(56) References Cited

U.S. PATENT DOCUMENTS 6,000,071 A * 12/1999 Fettes ..................... E04H 4/084 49/386
6,442,799 B1 * 9/2002 Duarte .................. E05F 1/1091 16/377

(Continued)

OTHER PUBLICATIONS

The International Search Report and the Written Opinion of the International Searching Authority, PCT/US20/017876, Dated Apr. 22, 2020.

*Primary Examiner* — Erin Deery
(74) *Attorney, Agent, or Firm* — Randall Dankin P.S

(57) ABSTRACT

A movement assistance and stowage device for a spa cover that is movable relative to a spa opening from a first position at least partially occluding the spa opening, to a second position removed from the spa opening and stowed adjacent the spa body and, when stowed, the spa cover is not substantially above an upper peripheral edge of the spa body, the movement assistance and stowage device providing a mounting body secured to a side portion of the spa body and carrying a pivoting lever arm and a pivoting control lever arm, and both pivoting arms are connected to, and extend between, the mounting body and a channel bracket on a lateral peripheral edge of the spa cover, and pneumatic cylinders extend between the mounting body and lever arm to provide mechanical advantage and control to movement and stowage of the spa cover.

9 Claims, 10 Drawing Sheets

(56) References Cited

U.S. PATENT DOCUMENTS

| | | | | |
|---|---|---|---|---|
| 2007/0209104 | A1 * | 9/2007 | Buzzetti | E04H 4/084<br>4/498 |
| 2016/0053505 | A1 * | 2/2016 | Dose | E04H 4/084<br>4/498 |

* cited by examiner

MOVEMENT ASSISTANCE AND STOWAGE DEVICE FOR A SPA COVER

CROSS REFERENCE TO RELATED APPLICATIONS

This Non-Provisional Patent Application is a United States National Stage Patent Application which claims the benefit of priority to earlier filed PCT Patent Application No, PCT/US2020/017876 which was filed on 12 Feb., 2020, and further claims the benefit of priority to still earlier filed US Provisional Patent Application No. 62/806,643 which was filed on 15 Feb., 2019. The entire contents of the aforementioned earlier filed PCT Patent Application, and the still earlier filed US Provisional Patent Application are both expressly incorporated herein by this reference. Pursuant to USPTO rules. this priority claim to earlier filed PCT Patent Application No. PCT/US2020/017876 and to still earlier filed US Provisional Patent Application No. 62/806,643 is also included in the Application Data Sheet (ADS) filed herewith.

TECHNICAL FIELD

The present invention relates to a movement assistance and stowage device for a spa cover, and more specifically to a device which is operable to permit a user to conveniently and easily move a spa cover, from a first position wherein the spa cover at least partially covers/occludes an opening to the spa, to a second position wherein the spa cover is removed from the spa opening and positioned adjacent the spa opening and at least partially vertically below the spa opening, and thereafter moving the spa cover from the second position back to the first position, in a manner not possible heretofore.

BACKGROUND OF THE INVENTION

Covers for spas or so-called "hot tubs" have been utilized for decades. Spa covers are often employed in cooler climates to minimize the escape of heat energy from the spa. Further, spa covers are often employed to cover the spa to prevent unauthorized access to the spa, or to prevent debris such as dirt, leaves, insects and the like from being deposited within, and collecting in, the spa. Heretofore, spa covers have had one or two or plural portions which have usually been fabricated from lightweight, insulative sheets, and which have been typically enclosed in a flexible, synthetic, fluid impermeable sheet or envelope. The portions of the spa cover are typically joined together by a continuous hinge. In most prior art spa covers the hinge is formed by a seam of flexible, typically fluid impermeable material which bridges between the adjacent spa cover portions. It has been a common practice to remove such prior art spa covers by swinging, pivoting or moving one portion of the spa cover onto the remaining portion(s), and then lifting the spa cover portions off of the top of the spa in order to expose the spa opening for use. As is described in various detail in many prior art references, this task of lifting/removing the spa cover has sometimes been difficult because of the awkwardness of the spa cover construction, and further due to the weight of these spa covers as the same spa covers have become heavier, over time, due to the absorption of water which is occasioned by their proximity to the underlying heated spa water, or because water is absorbed from the ambient environment. In my U.S. patent application Ser. No. 14/526,825 which was filed on Oct. 29, 2014, describe a rigid spa cover which has plural individual portions which are operable to fold onto themselves and then be removed separately from the underlying spa so as to assist in the opening of the spa. The spa cover of U.S. application Ser. No. 14/526,825 has achieved a great deal of commercial success, and experienced wide-spread market acceptance because the construction substantially prevents the absorption of water into the interior of the spa cover portions, and further this design permits a user to stand on the spa cover in order to remove accumulations of snow, leaves and other debris that might be occasioned during the fall and winter seasons.

While the aforementioned spa cover designs which I have commercially introduced have achieved a great deal of commercial success, users of spas who have various medical conditions, or otherwise have reduced strength, still find some difficulty in removing such spa covers to expose the spa opening for use under certain environmental conditions such as when the spa is covered with moderate amounts of snow or other conditions such as high winds exist, and/or where the spa is installed in a location where it is only accessible from limited positions, such as, but not limited to, only one side.

Further, one of the recognized drawbacks of known spa cover movement/removal/storage devices is that when the spa cover is removed from the first position covering/occluding the spa opening, the removed and stowed spa cover is adjacent to and extends substantially vertically above the spa opening such that the removed/stowed spa cover obscures the vision of spa users, and the removed/stowed spa cover, with its large planar surface area may behave similar to a "sail" and is therefore is susceptible to being moved, or otherwise forcefully acted upon, by winds and wind gusts, and as a result, the spa cover damages the cover lifting/moving apparatus by twisting and yawing movements, and may further fall onto spa users causing injuries.

It is therefore an object of the instant invention to provide a device that assists in the removal of a spa cover from a spa opening, and likewise assists in the stowage of the spa cover adjacent the spa, and the spa cover when in the stowage position, does not substantially extend above an upper peripheral edge of the spa opening so that users of the spa do not have their vision blocked or obscured by the spa cover in the storage position, and the stowed spa cover is less susceptible to being forcefully acted upon by winds and wind gusts.

A movement assistance and stowage device is described in the present patent application, and which aids and assists in the movement and stowage of a spa cover to uncover a spa in a particularly easy, and novel manner which is not shown or described in the prior art teachings. The movement assistance device as described, and claimed is easy and simple to use, and further allows users, even users with reduced strength, to readily remove a spa cover in a convenient and safe manner which was not possible, heretofore. Further still, the movement assistance device described herein positions the removed and stowed spa cover at a position which is at least partially below the vertical level of the spa's upper peripheral edge so that spa user's vision is not obstructed and the spa cover is less likely to be forced to a second/closed position suddenly/unexpectedly, such as by wind gusts.

SUMMARY OF THE INVENTION

A first aspect of the present invention relates to a movement assistance and stowage device for a spa cover wherein the spa cover is movable, relative to a spa body, between a first position at least partially occluding a spa opening, and a second position wherein the spa cover is removed from the spa opening and is stowed adjacent to a side portion of the spa body, the movement assistance and stowage device comprising a mounting body secured to the spa body, the mounting body having an elbow lever arm mount, a control lever arm mount, and a ball mount; an elbow lever arm pivotally carried on the elbow lever arm mount, the elbow lever arm having a first leg and a second leg, and the first leg is angularly disposed relative to the second leg and the first leg has an end portion opposite the second leg, and the end portion of the first leg is pivotally interconnected to the spa cover, and the second leg carries a ball mount proximate an end portion opposite the first leg; a control lever arm pivotally carried on the control lever arm mount, the control lever arm having an end portion opposite the control lever arm pivot axle mount that pivotally interconnects with the spa cover; and a biasing cylinder communicating between, and pivotally interconnected with the ball mount carried by the mounting body, and the ball mount carried by the elbow lever control arm.

A second aspect of the present invention relates to a movement assistance and stowage device for a spa cover and further comprising a channel bracket secured to a lateral peripheral edge of the spa cover, the channel bracket having, a first pivot yoke at a first end portion and a second pivot yoke at a second end portion, each pivot yoke defining aligned pivot axle holes; and the end portion of the first leg of the elbow lever control arm pivotally interconnects with the first pivot yoke, and the end portion of the control lever arm, opposite the control lever arm pivot axle mount, pivotally interconnects with the second pivot yoke.

A third'aspect of the present invention relates to a movement assistance and stowage device for a spa cover and further comprising a rotation limiter/stopper carried by one of the elbow lever control arm, or the control lever arm, to prevent the elbow lever control arm and the control lever arm from directly frictionally contacting one another when the spa cover is in the second position.

A fourth aspect of the present invention relates to a movement assistance and stowage device for a spa cover and wherein the biasing cylinder mechanically cooperates with the spa cover through the elbow lever arm, and the control lever arm, and the mounting body secured to the spa body to assist in the movement of the spa cover from the first position wherein the spa cover at least partially occludes the spa opening, to the second position wherein the spa cover is stowed adjacent and generally parallel to a rearward side portion of the spa body and wherein the stowed spa cover s at least partially vertically below an upper peripheral edge of the spa body that defines the spa opening, and wherein the biasing cylinder, the lever arms and the mounting body further assist in the return of the spa cover from the second position back to the first position relative to the spa body wherein the spa cover at least partially occludes the spa opening.

A fifth aspect of the present invention relates to a movement assistance and stowage device for a spa over having opposing lateral peripheral edges, and wherein the spa cover is movable relative to a spa body, between a first position wherein the spa cover at least partially covers/occludes a spa opening defined by the spa body, and a second position wherein the spa cover is removed from the spa opening and is stowed at a position adjacent to a side portion of the spa, body, the movement assistance and stowage device comprising a channel bracket secured to a lateral peripheral edge of the spa cover, the channel bracket having, a first pivot yoke at a first end portion and a second pivot yoke at a second end portion, each pivot yoke defining aligned pivot axle holes; a mounting body secured to the spa body, the mounting body having, a first end portion, a second end portion, an elbow lever arm pivot axle mount, a control lever arm pivot axle mount, at least one predetermined ball mount location, and at least one ball mount in the ball mount location; an elbow lever arm pivotally carried on a pivot axle engaged with the elbow lever arm pivot axle mount, the elbow lever arm having, a first leg and a second leg, and the second leg is angularly disposed relative to the first leg, and the first leg defines a pivot axle hole proximate an end portion opposite the second leg, and the pivot axle hole carries a pivot axle that is journaled by the first pivot yoke of the channel bracket so that the first leg is pivotally interconnected with the channel bracket, and the second leg defines a predetermined ball mount location proximate an end portion opposite the first leg, and at least one ball mount in the predetermined ball mount location; a control lever arm pivotally carried on a pivot axle engaged with the control lever arm pivot axle mount, the control lever arm is elongate and has a first end portion and a second end portion, and each end portion defines a pivot axle hole, and the pivot axle hole defined in the first end portion carries a pivot axle that is pivotally journaled by the second pivot yoke of the channel bracket so that the first end portion is pivotally interconnected with the channel bracket, and the pivot axle hole defined in the end portion carries a pivot axle that engages with the control lever arm pivot axle mount carried by the mounting body; and a pneumatic cylinder communicating between, and pivotally interconnected with the at least one ball mount carried by the mounting body, and with the at least one ball mount carried by the second leg of the elbow lever control arm.

A sixth aspect of the present invention relates to a movement assistance and stowage device for a spa cover and further comprising a second ball mount carried by the mounting body in a second predetermined precise ball mount location thereon; a second ball mount carried by the elbow lever control arm in a second predetermined precise ball mount location thereon proximate the end portion of the second leg; and a second pneumatic cylinder communicating between the second ball mount carried by the mounting body and the second ball mount carried by the elbow lever control arm.

A seventh aspect of the present invention relates to a movement assistance and stowage device for a spa cover and wherein the channel bracket is positionally secured to a lateral peripheral edge of the spa cover spacedly between a hinge peripheral edge and an end peripheral edge, and the channel bracket has a first end portion, a second end portion, a top portion, channel side portions extending downwardly from the top portion and defining an interior channel extending between the first end portion and the second end portion, and a predetermined length dimension between aligned pivot axle holes defined in yoke arms of the first pivot yoke, and aligned pivot axle holes defined in yoke arms of the second pivot yoke, and a cover edge flange carried by, and extending generally upwardly from, and parallel to, the top portion, and the cover edge flange defines a surface portion that is configured to fixedly engage with the lateral peripheral edge of the spa cover, and the cover edge flange defines fastener holes for fasteners to extend therethrough.

An eighth aspect of the present invention relates to a movement assistance and stowage device for a spa cover and wherein the mounting body is secured to a vertical lateral side portion of the spa body spacedly adjacent a top edge of the spa body and proximate a rearward side portion of the spa body, and the mounting body has, an outer peripheral edge, and defines an interior cavity with an interior mounting surface, the body further having a top edge portion, and a bottom edge portion, and the top edge portion defines a gap to permit the lever arm to extend therethrough; and the elbow lever arm pivot axle mount is at a generally medial position between the first end portion and the second end portion; and the control lever arm pivot axle mount is proximate the second end portion of the mounting body; and the interior cavity defines, proximate the first end portion, plural predetermined ball mount locations for at least a first ball mount and a second ball mount.

A ninth aspect of the present invention relates to a movement assistance and stowage device for a spa cover and wherein the elbow lever arm is pivotally carried on a pivot axle engaged with the elbow lever arm pivot axle mount and is carried at least partially within the interior cavity of the mounting body, the elbow lever arm having, a body with a first longer leg and a second short leg, and the second short leg is angularly disposed relative to the first longer leg at an angle/elbow therebetween, the first longer leg and the second short leg each having a terminal end portion opposite the angle/elbow and the first longer leg defines a pivot axle hole proximate the terminal end portion, and the first leg at least partially extends through the gap defined in the mounting body peripheral edge and a pivot axle carried in the pivot axle hole is pivotally journaled by the first pivot yoke of the channel bracket, the elbow lever arm body further defining a rotation axle hole at a position proximate the angle/elbow for a rotation axle that engages with the elbow lever arm pivot axle mount within the mounting body interior cavity, and the second short leg defines plural predetermined ball mount locations proximate an end portion opposite the angle/elbow for at least a first ball mount, and a second ball mount.

A tenth aspect of the present invention relates to a movement assistance and stowage device for a spa cover and wherein the control lever arm is elongate and is pivotally carried on a pivot axle engaged with the control lever arm pivot axle mount, and is carried at least partially within the interior cavity of the mounting body, the control lever arm having a first end portion and a second end portion, and each end portion defines a pivot axle hole proximate a terminal end portion, and the first end portion at least partially extends through a gap defined in the mounting body peripheral edge and the first end portion of the control lever arm is pivotally interconnected to the second pivot yoke of the channel bracket on a pivot axle extending therethrough, and the second end portion of the control lever arm is pivotally interconnected with the control lever arm pivot axle mount of the mounting body within the interior cavity of the mounting body with a pivot axle extending therethrough.

An eleventh aspect of the present invention relates to a movement assistance and stowage device for a spa cover and further comprising a rotation limiter/stopper carried by one of the elbow lever control arm, or the control lever arm, to prevent the elbow lever control arm and the control lever arm from directly functionally contacting one another when the spa cover is in the second position, A twelfth aspect of the present invention relates to a movement assistance and stowage device for a spa cover and wherein the pneumatic cylinder mechanically cooperates with the spa cover through the channel bracket, and the elbow lever arm, and the control lever arm, and the mounting body secured to the spa body side portion to assist in the movement of the spa cover from the first position wherein the spa cover at least partially occludes the spa opening, to the second position wherein the spa cover is stowed adjacent and generally parallel to the rearward side portion of the spa body and wherein the stowed spa cover is at least partially vertically below the upper peripheral edge of the spa body that defines the spa opening, and wherein the pneumatic cylinder, the channel bracket, the lever arms and the mounting body further assist in the return of the spa cover from the second position back to the first position relative to the spa body wherein the spa cover at least partially occludes the spa opening.

A thirteenth aspect of the present invention relates to a movement assistance and stowage device for a spa cover having opposing lateral peripheral edges and opposing hinge and end peripheral edges, and wherein the spa cover is movable relative to a spa body, from a first position wherein the spa cover at least partially covers/occludes a spa opening defined by the spa body, and a second stowed position wherein the spa cover is removed from the spa opening and is stowed at a position spacedly adjacent to and generally parallel to a rearward side portion of the spa body, the movement assistance and stowage device comprising a channel bracket secured to a lateral peripheral edge of the spa cover spacedly between the hinge peripheral edge and the end peripheral edge, the channel bracket having a first end portion, a second end portion, a top portion, two opposing channel side portions extending downwardly from the top portion and defining an interior channel extending between the first end portion and the second end portion, a first pivot yoke at the first end portion and a second pivot yoke at the second end portion with a predetermined length dimension between aligned pivot axle holes defined in yoke arms of the first pivot yoke, and aligned pivot axle holes defined in yoke arms of the second pivot yoke, and a cover edge flange carried by, and extending generally upwardly from, and parallel to, the top portion, and the cover edge flange defines a surface portion that is configured to fixedly engage with the lateral peripheral edge of the spa cover and the cover edge flange defines fastener holes; a mounting body secured to a vertical lateral side portion of the spa body spacedly adjacent a top peripheral edge of the spa body and proximate the rearward side portion of the spa body, the mounting body having an outer peripheral edge and defines an interior cavity with an interior mounting surface, a first end portion, a second end portion, a top edge portion, and a bottom edge portion, the top edge portion and the bottom edge portion each define gaps to accommodate lever arms to extend therethrough, and the mounting body carries, within the interior cavity an elbow lever arm pivot axle mount at a generally medial position between the first end portion and the second end portion, and a control lever arm pivot axle mount at a position proximate to the second end portion, the interior cavity further having, proximate the first end portion, plural predetermined ball mount locations for a first ball mount, a second ball mount and a third ball mount; an elbow lever arm pivotally carried at least partially within the interior cavity of the mounting body, the elbow lever arm having a first longer leg and a second short leg, and the second short leg is angularly disposed relative to the first longer leg at an angle/elbow therebetween, the first longer leg and the second short leg each having a terminal end portion opposite the angle/elbow, and the first longer leg defines a pivot axle hole proximate a terminal end portion, the elbow lever arm further having a first exterior lateral surface and a second interior lateral surface with a thickness dimension therebetween, and the first longer leg at least partially extends through the gap defined in the mounting body peripheral edge and is pivotally journaled by the first pivot yoke of the channel bracket on a pivot axle extending therethrough, the elbow lever arm further defining a rotation axle hole extending through the thickness dimension at a position proximate to the angle/elbow for a rotation axle that engages with the elbow lever arm pivot axle mount within the mounting body interior cavity, and the first exterior lateral surface of the second short leg defines plural predetermined ball mount locations proximate to a terminal end portion thereof for a first ball mount, a second ball mount and a third ball mount; a control lever arm pivotally carried partially within the interior cavity of the mounting body, the control lever arm is elongate and has a first end portion and a second end portion, and each end portion defines a pivot axle hole, the control lever arm further having a first exterior lateral surface and a second interior lateral surface with a thickness dimension therebetween, and the first end portion at least partially extends through the gap defined in the mounting body peripheral edge and is pivotally journaled by the second pivot yoke of the channel bracket on a pivot axle extending therethrough, and the second end portion is pivotally interconnected with the control lever arm pivot axle mount within the interior cavity of the mounting body with a pivot axle extending therethrough; and two pneumatic cylinders which extend between and are pivotally interconnected with the ball mounts carried by the mounting body and at the first end thereof, and with the ball mounts carried on the lateral exterior facing surface of the second end of the elbow lever control arm, and the two pneumatic cylinders mechanically cooperate with the spa cover through the channel bracket and the elbow lever arm and the control lever arm and the mounting body secured to the spa body side portion to assist in the movement of the spa cover from the first position wherein the spa cover at least partially occludes the spa opening, to the second stowed position wherein the spa cover is stowed adjacent and generally parallel to the rearward side portion of the spa body and wherein the stowed spa cover is positioned at least partially vertically below the upper peripheral edge of the spa body that defines the spa opening, and wherein the two pneumatic cylinders, the channel bracket, the lever arms and the mounting body further assist in the return of the spa cover back to the first position relative to the spa body which at least partially occludes the spa opening.

A fourteenth aspect of the present invention relates to a movement assistance and stowage device for a spa cover wherein the spa cover is movable, relative to a spa body, between a first position at least partially occluding a spa opening, and a second position wherein the spa cover is removed from the spa opening and is stowed adjacent to a side portion of the spa body, the movement assistance and stowage device comprising a mounting body secured to the spa body, the mounting body having an elbow lever arm mount, a control lever arm mount, and a ball mount; an elbow lever arm pivotally carried on the elbow lever arm mount, the elbow lever arm having a first leg and a second leg, and the first leg is angularly disposed relative to the second leg and the first leg has an end portion opposite the second leg, and the end portion of the first leg is pivotally interconnected to the spa cover, and the second leg carries a ball mount proximate an end portion opposite the first leg; a control lever arm pivotally carried on the control lever arm mount, the control lever arm having an end portion opposite the control lever arm pivot axle mount that pivotally interconnects with the spa cover; and a biasing cylinder communicating between, and pivotally interconnected with the ball mount carried by the mounting body, and the ball mount carried by the elbow lever control arm.

A fifteenth aspect of the present invention relates o a movement assistance and stowage device for a spa cover wherein the spa cover is movable, relative to a spa body, between a first position at least partially occluding a spa opening and a second position wherein the spa cover is removed from the spa opening and is stowed adjacent to a side portion of the spa body and a hinge peripheral edge of the spa cover, when the spa cover is in the second open/stowage position, is coplanar with a top edge of the spa body.

These and other aspects of the present invention will be discussed in greater detail hereafter.

BRIEF DESCRIPTIONS OF THE DRAWINGS

FIG. 1 is a side and top view of the instant invention showing the channel bracket interconnected with a lateral peripheral edge of the spa cover, the elbow lever arm and the control lever arm pivotally carried within the mounting body fixedly secured to a side portion of the spa body, the elbow lever arm and the control lever arm pivotally interconnected with the channel bracket yokes, and two pneumatic cylinders communicating between ball mounts carried by the mounting body and ball mounts carried by the second short leg of the elbow lever arm, the attached spa cover in a first occluding position relative to the spa opening.

FIG. 2 is a close-up side view of the first end portion of the interior cavity of the mounting body showing the first and second pneumatic cylinders interconnected to the first and second ball mounts, and a position of the third ball mount.

FIG. 3 is a close-up side view of the second end portion of the interior cavity of the mounting body showing the first and second pneumatic cylinders interconnected to the first and second ball mounts of the second short leg of the elbow lever arm, and the orientation of the control lever arm relative to the elbow lever arm when the attached spa cover is in the first occluding closed position relative to, the spa opening.

DETAILED DESCRIPTION OF THE PREFERRED EMBODIMENT

This disclosure of the invention is submitted in furtherance of the Constitutional purposes of the US Patent Laws "to promote the progress of science and useful arts" (Article 1, Section 8).

The present invention as depicted in the Figures, and which is further indicated by the numeral 10, addresses the problems associated with users who might find it difficult to remove a spa cover 40 either because of reduced strength, or because of ambient environmental conditions such as snow and the like upon the spa cover 40 and/or high wind or gusty wind conditions.

Figure 9:
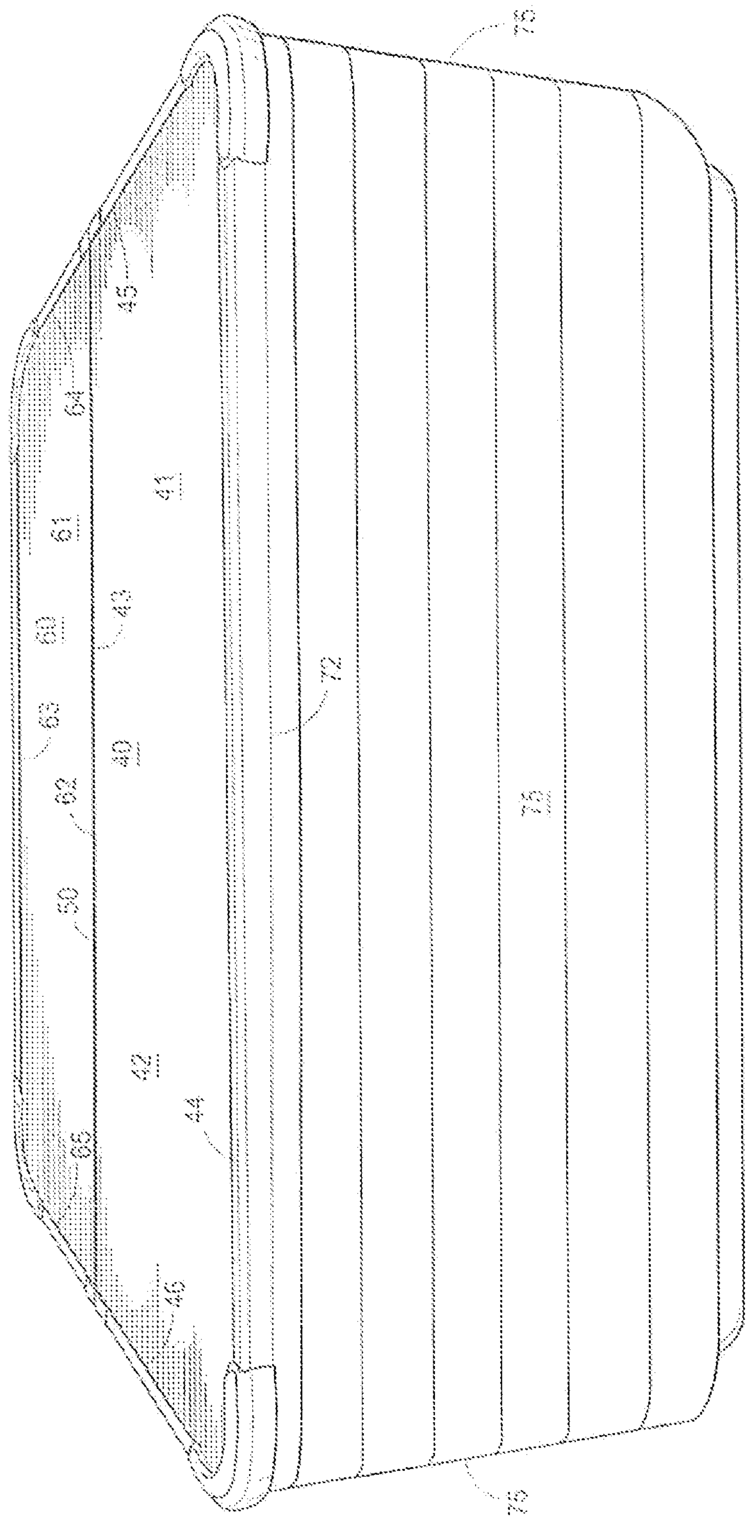
FIG. 9 is a perspective view of a known spa cover resting on a spa and occluding the spa opening, and such cover is similar to a spa cover upon which the instant invention may be used.
Figure 10:
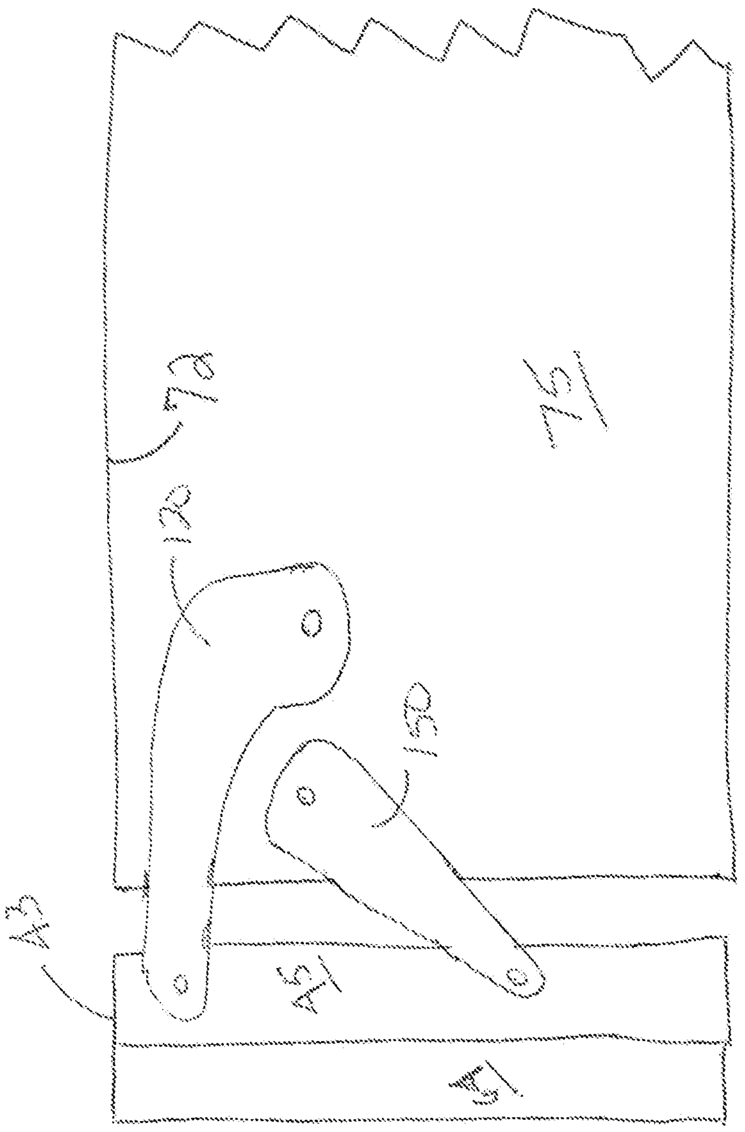
FIG. 10 is an orthographic. partial cut-away, side view of the spa body showing the spa cover in the second open/stowage position adjacent to a rearward peripheral edge of the spa body, and showing the hinge peripheral edge of the spa cover co-planar with the top peripheral edge of the spa body.

The rigid spa cover 40 as seen in the attached FIG. 9 is similar in construction to what is seen in U.S. Pat. No. 8,813,275 although the instant invention 10 is equally applicable to other types of spa covers 40 including covers that are not "rigid". In this regard, the spa cover 40 has a first portion 41 which is defined by a main body 42, and which further is defined by a hinge peripheral edge an end peripheral edge 44; and first and second lateral peripheral edges 45 and 46, respectively, and which are referred to, hereinafter, as the opposite peripheral edges. The hinge peripheral edge 43 may be fastened to a continuous hinge or joint 50 which extends substantially along the entire length of the hinge peripheral edge 43.

A second portion of the spa cover 40, is generally indicated by the numeral 60, and may be mounted to the continuous hinge 50 thereby rendering the second portion 60 at least partially, rotatably moveable relative to the first portion 41. The second portion has a main body 61 which is defined by a hinge peripheral edge 62 which is attached to the continuous hinge 50, and an opposite end peripheral edge 63. Like the first portion 41 the second portion 60 has first and second laterally disposed peripheral edges 64 and 65. The laterally disposed peripheral edges 64 and 65 will hereinafter be referred to in this disclosure as being the opposite peripheral edges. The first and second portions 41 and 60, respectively, are sized so that when the individual portions 41 and 60 are disposed in a substantially co-planar orientation, the surface area of first and second portions 41, 60 is large enough to substantially occlude an underlying spa opening 73 as will be discussed in the paragraphs which follow.

Although not shown in the photographs, the cover 40 may have more than two adjacent segments, and further the cover segments may open, and be movable/pivotal, toward both opposing end portions of a spa 70, such as for instance, but not limited to a "swim spa™" that may have a length dimension substantially greater than a width dimension. In such configurations, it is contemplated that more than one of the herein described invention 10 may be simultaneously used on the same spa 70 to move, remove and stow the cover 40.

As seen in the Figures, the instant invention 10 generally provides a channel bracket 80, a mounting body 170, an elbow lever arm 120, a control lever arm 150 and at least one biasing pneumatic cylinder 200.

The channel bracket 80 has a main body with a first end portion 81, a second end portion 82, a top portion 90 and two opposing channel side portions 92 that extend generally vertically downwardly from the top portion 90 and define an interior channel 93. A first pivot yoke 94, having two spaced apart first yoke arms 95, is carried at the first end portion 81 of the channel bracket 80. A width dimension 96 is defined between the two spaced apart first yoke arms 95 and each of the first yoke arms 95 defines a medially positioned forward pivot axle hole 97 to journal a forward pivot axle 98. A second pivot yoke 99 having two spaced apart second yoke arms 100 is carried at the second end portion 82 of the channel bracket 80. The same width dimension 96 is defined between the two spaced apart second yoke arms 100 and each of the second yoke arms 100 defines a medially positioned rearward pivot axle hole 102 to journal a rearward pivot axle 103.

A cover edge flange 83 is structurally carried on the top portion 90 of the channel bracket 80 and extends generally parallel thereto. The cover edge flange 83 has a generally horizontal leg 84 and a generally vertical leg 85 which are interconnected to one another by an integral bend 87 therebetween and a bottom edge 86 of the vertical leg structurally communicates with the top portion 90 of the channel bracket 80. The cover edge flange 83 further defines an interior facing generally concave surface (not shown) and an opposing exterior generally convex surface 89. The interior facing generally concave surface (not shown) is configured so as to engage with the lateral peripheral edge 45, 46, 64, 65 of the spa cover 40. The cover edge flange 83 horizontal leg 84 and vertical leg 85 may define plural fastener holes therein, to carry fasteners (not shown) to secure the cover edge flange 83, and the channel bracket 80 to the lateral peripheral edge 45, 46, 64, 65 of the spa cover 40. in a further contemplated embodiment however, adhesives, such as, but not limited to, contact cement, epoxy, adhesive tapes, and the like, may also or alternatively, be used to secure the channel bracket 80 to the lateral peripheral edge 45, 46, 64, 65 of the spa cover 40. It is to be understood that the channel brackets 80 are installed in pairs, wherein one channel bracket 80 is secured to each opposing lateral peripheral edge 45, 46, 64, 65 of the spa cover 40 first portion 41 and/or spa cover 40 second portion 60. in an even further contemplated embodiment (not shown) the first pivot yoke 94 and the second pivot yoke 99 may be integrated into the spa cover 40 such that a separately affixed channel bracket 80 is not required, and yet the pivot points for the present invention 10 are provided.

Figure 1:
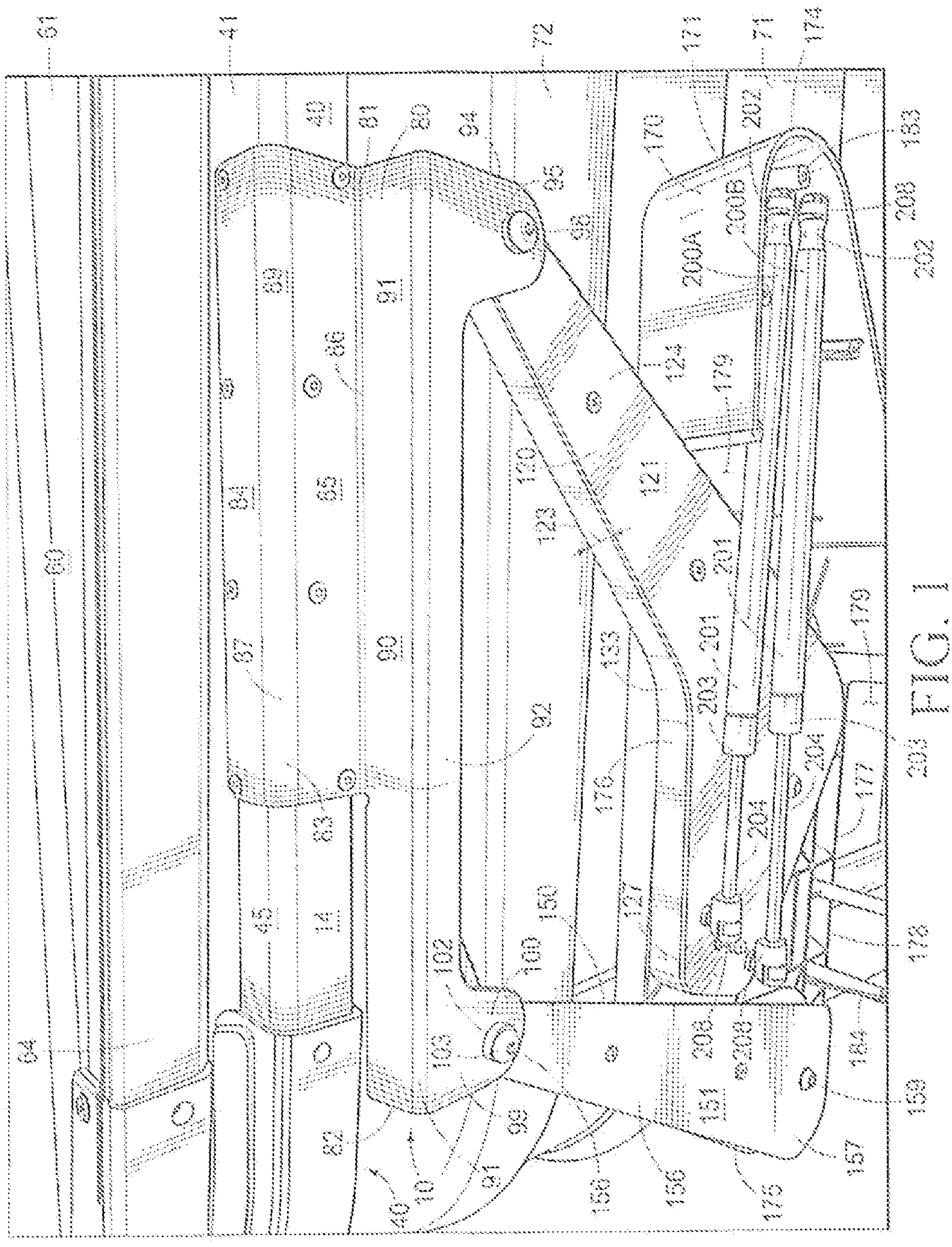
Figure 2:
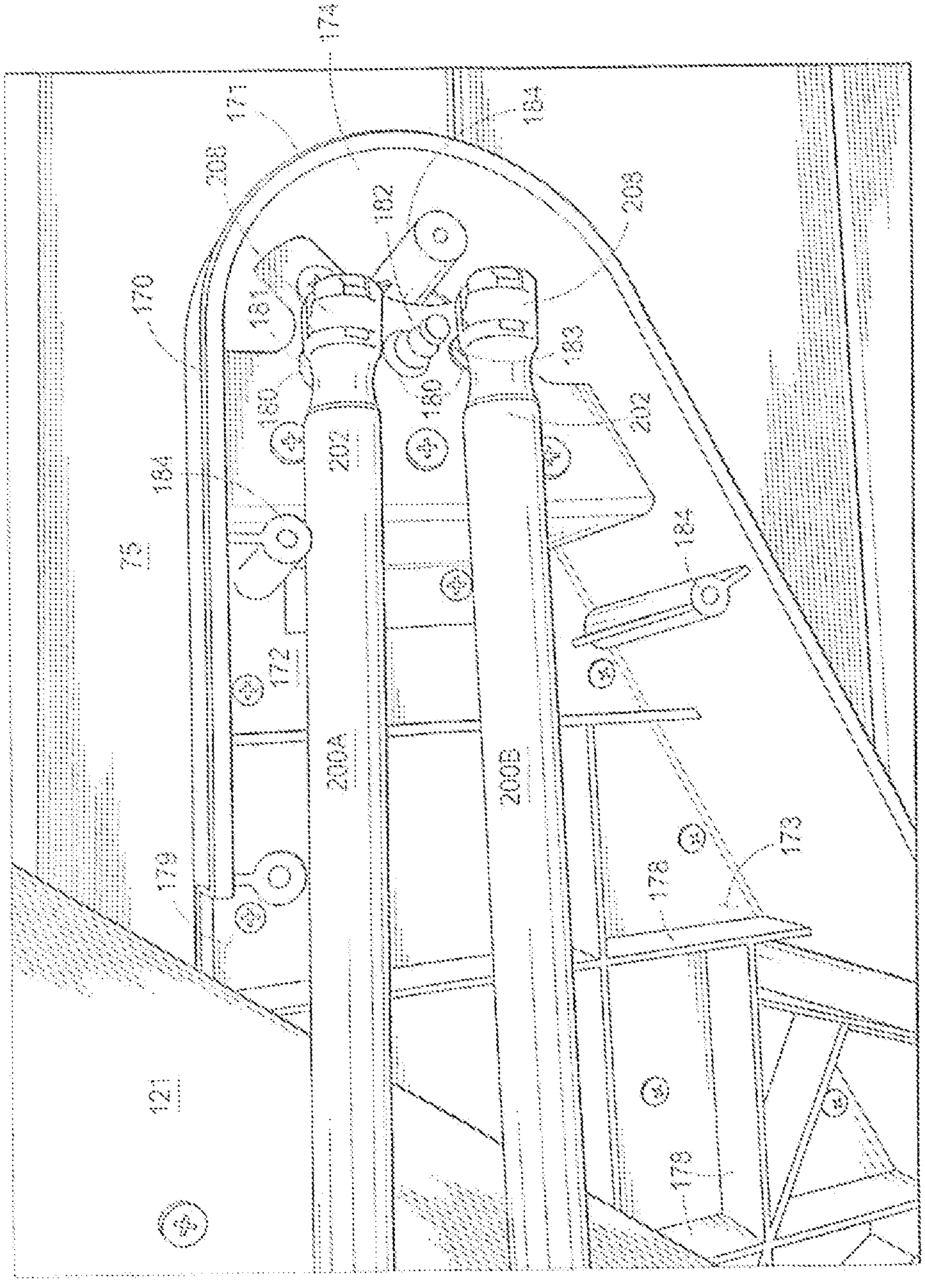
Figure 3:
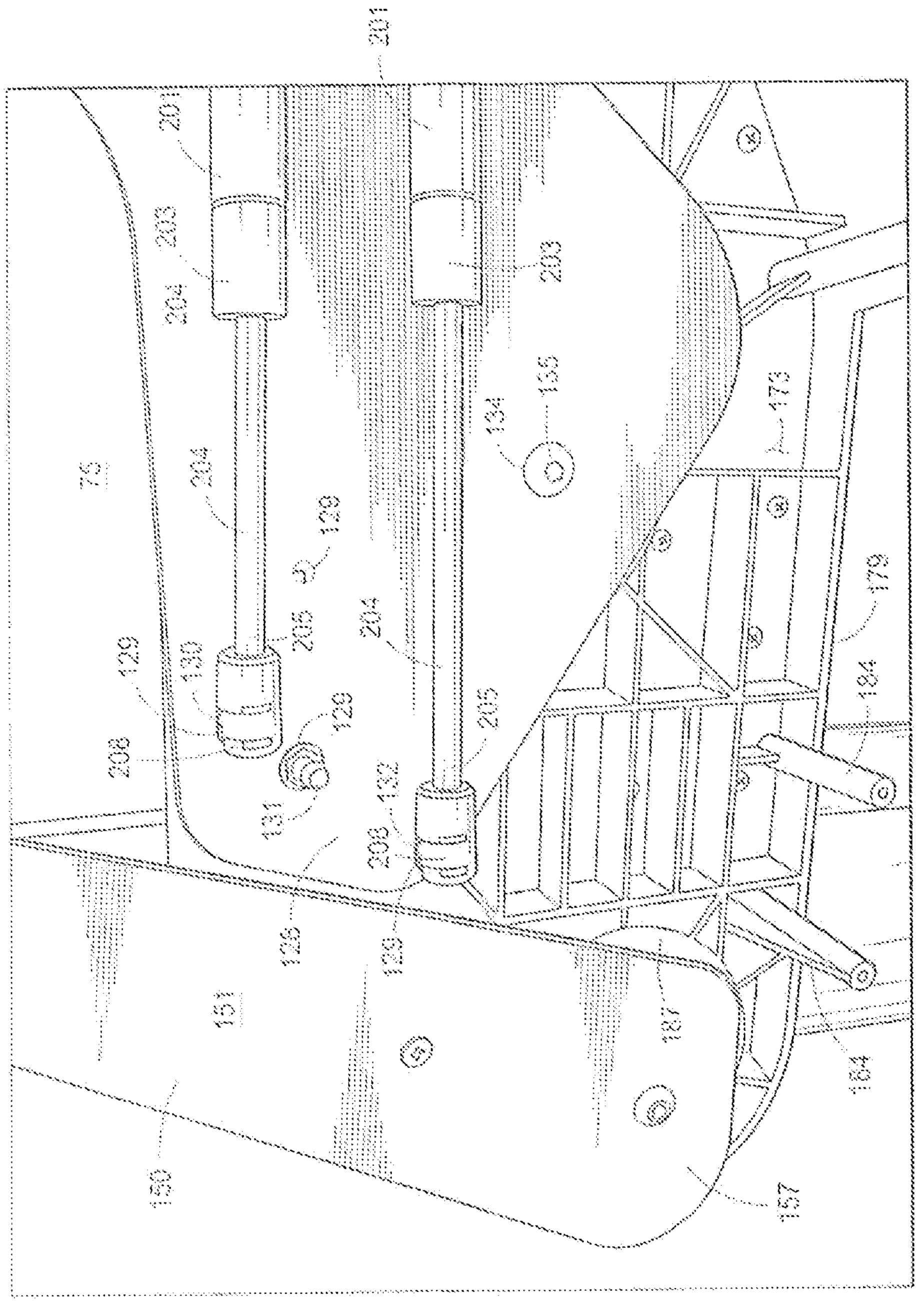
Figure 4:
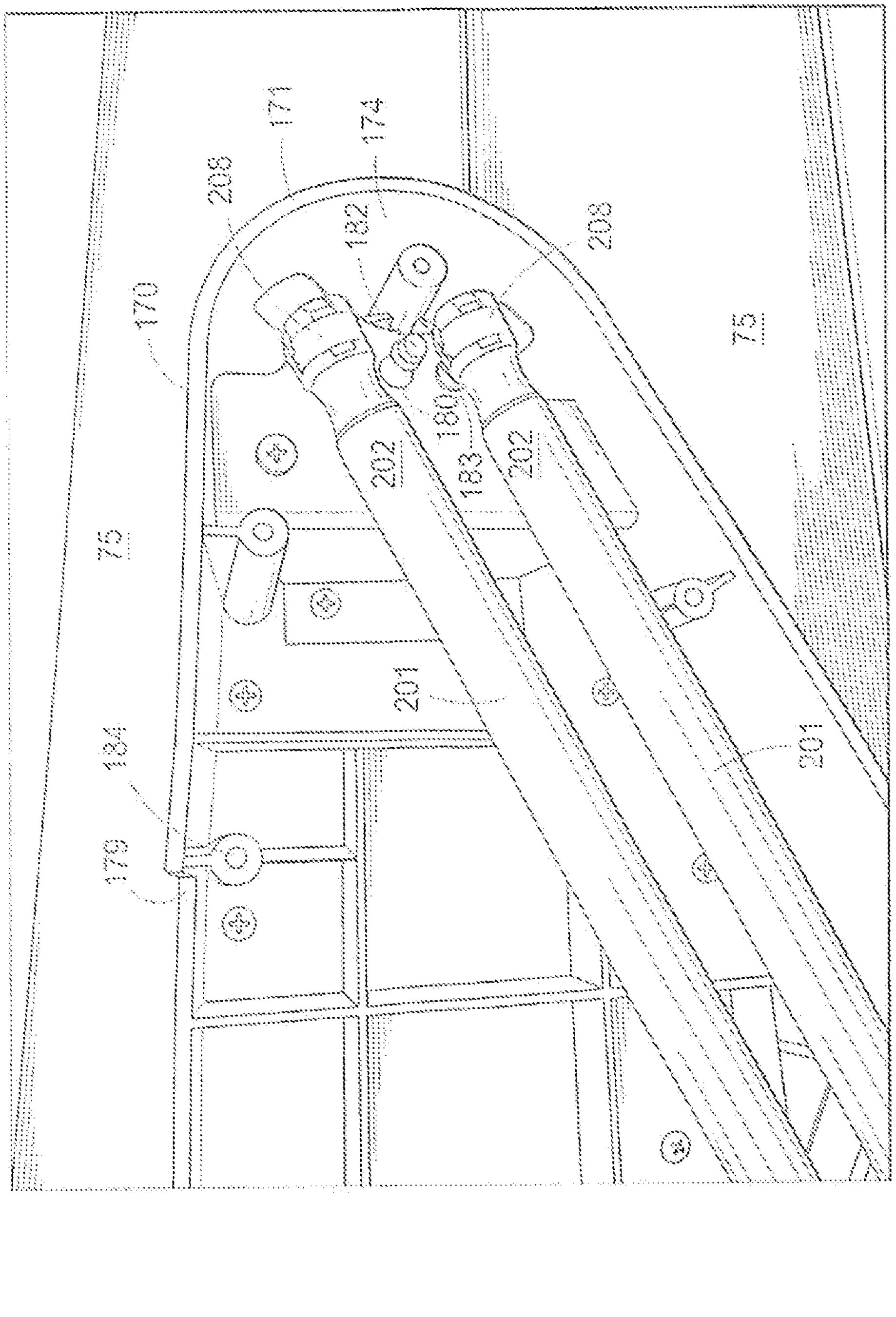
FIG. 4 is a close-up side view, similar to that of FIG. 2, showing the orientation of the two pneumatic cylinders when the attached spa cover is pivoted to the second open/stowage position.
Figure 5:
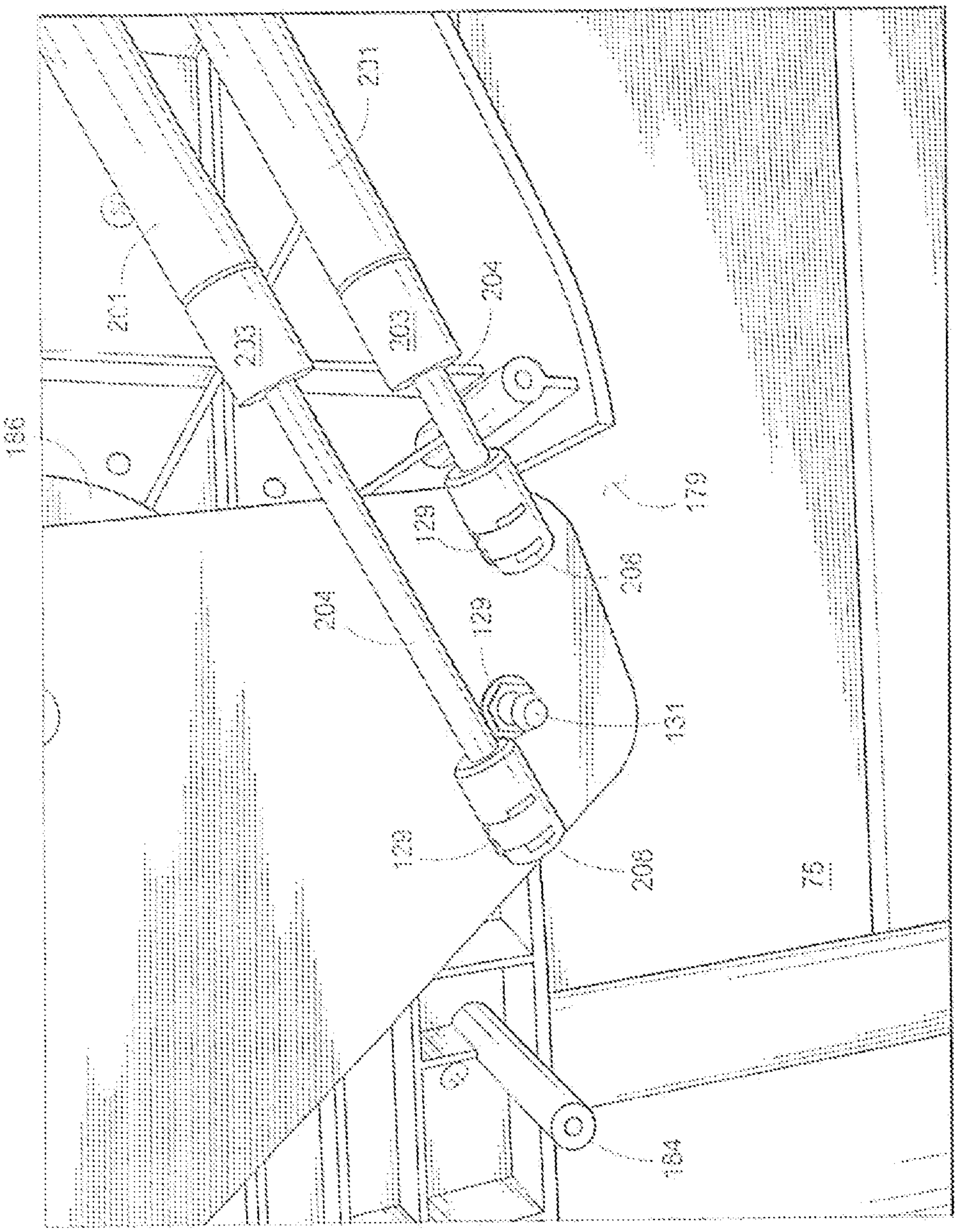
FIG. 5 is a close-up side view, similar to that of FIG. 3, showing the orientation of the two pneumatic cylinders relative to the second short leg of the elbow lever arm when the attached spa cover is pivoted to the second open/stowage position.

The mounting body 170, as is shown in FIG. 1, has a body with an outer peripheral edge 171 and an interior mounting surface 172. The outer peripheral edge 171 and interior mounting surface 172 define an internal cavity 173. The mounting body 170 further has a first end portion 174, a second end portion 175, a top edge portion 176 and a bottom edge portion 177. Reinforcing ribs 178 within the mounting body 170 provide strength and structural rigidity thereto. Gaps 179 are defined in the outer peripheral edge 171 to accommodate pivotal movement of the elbow lever arm 120 and pivotal movement of the control lever arm 150 so that portions of the lever arms 120, 150 may extend therethrough.

Plural predetermined ball mount locations 180 are defined within the internal cavity 173 proximate the first end portion 174, and as shown in the Figures, the ball mount locations 180 are threaded holes, but may have other configurations such as, but not limited to, through holes, snap fittings, protuberance, etc. The plural predetermined ball mount locations 180 are configured to receive, at predetermined and precise locations, a first ball mount 181, and if desired a second ball mount 182, and if desired, a third ball mount 183, and if desired additional ball mounts (not shown). The precisely positioned ball mounts 181, 182, 183 provide a mounting point, and a pivotal connection for one end of the biasing pneumatic cylinder 200.

An elbow lever am pivot axle mount 186 is carried within the internal cavity 173 at a generally medially positioned therein, and a control lever arm pivot axle mount 187 is carried within the internal cavity 173 proximate to the second end portion 175. Each of the elbow lever arm, and control lever arm axle mounts 186, 187 is configured to carry a rotation axle 135, 159 to allow the elbow lever arm 120 and the control lever arm 152, respectively, to rotate thereabout and relative to the mounting body 170.

Plural cover mounting tabs 184 are spacedly arrayed about the outer peripheral edge 171, of the mounting body 170, and are configured to receive fasteners for securing an obscuring safety cover (not shown) to the mounting body 170 so as to cover and obscure the internal cavity 173 and to protect the components therein.

The elbow lever arm 120 has a first longer leg 124 and a second short leg 127 with an angle/elbow 133 therebetween. The first longer leg 124 has a terminal end portion 125 opposite the angle/elbow 133 and the terminal end portion 125 defines a medially located first pivot axle hole (not shown) to receive and carry forward pivot axle 98. As shown in the Figures, at least a portion of the first longer leg 124 extends outwardly from the mounting body 170 through the gap 179 defined in the outer peripheral edge 171. The forward pivot axle 98 carried within the first pivot axle hole (not shown) defined in the terminal end portion 125 of the first longer leg 124, is interconnected with and journaled by the first pivot yoke 94 of the channel bracket 80. The interconnection of the forward pivot axle 98 with the first pivot yoke 94 of the channel bracket 80 and with the first longer leg 124 of the elbow lever arm 120 provides a pivotal interconnection between the elbow lever arm 120 and the channel bracket 80, and to the spa cover 40.

A rotation axle hole 134 is defined in the elbow lever arm 120 proximate to the angle/elbow 133 and the rotation axle hole 134 extends transversely through thickness 123 of the elbow lever arm 120 from a first lateral surface 121 to an opposing second lateral surface (not shown). A predetermined distance 136 is fixed between the rotation axle hole 134 and the first pivot axle 98 of the first longer leg 124. Similarly, a shorter predetermined distance 137 is fixed between the rotation axle hole 134 and the terminal end 128 of the second short leg 127.

The second short leg 127 has a terminal end portion 128 opposite the angle/elbow 133 and plural predetermined and precisely located ball mount holes 129 are defined in the first lateral surface 121 of the second short leg 127 proximate to the terminal and 128 thereof. The plural ball mount holes 129 are configured to carry at least a first ball mount 130, and if desired a second ball mount 131 and if desired a third ball mount 132. and if desired additional ball mounts (not shown). The location of each of the ball mount holes 129, relative to the rotation axle hole 134 is predetermined and precise so as to maximize leverage and mechanical forces so as to facilitate and ease operation of the instant invention 10. The first, second and third ball mounts 130, 131, 132 respectively, each provide a mounting point, and a pivot pivotal connection for one end of the biasing pneumatic cylinder 200.

The control lever arm 150, as shown in the Figures, is elongate and has a first lateral surface 151, an opposing second lateral surface (not shown) with a thickness dimension therebetween. The control lever arm 150 has a first end portion 154 that defines a first end pivot axle hole 155 for receiving and carrying a first end pivot axle 156 that is interconnected with and journaled by the second pivot yoke 99 of the channel bracket 80, or carried by the spa cover 40, to facilitate pivotal/rotational movement therebetween. The control lever arm 150 further has a second end portion 157 that defines a second end rotation axle hole (not shown) for receiving and carrying a second end rotation axle 159. The second end rotation axle 159 extends through the second end rotation axle hole and through the thickness of the control lever arm 150 and engages with the control lever arm pivot axle mount 187 within the interior cavity 173 of the mounting body 170 so that the control lever arm 150 may pivot about the rotation axle 159 relative to the mounting body 170. The first end portion 154 of the control lever arm 150 extends through the gap 179 defined in the outer peripheral edge 171 of the mounting body 170 so as to pivotally engage with the second pivot yoke 99 of the channel bracket 80.

At least one, preferably two, and possibly three biasing pneumatic cylinders 200 pivotally and axially communicate between the ball mounts 181 182, 183 of the mounting body, and the ball mounts 130, 131, 132 of the elbow lever arm 120 to provide mechanical assistance, and biasing, to rotation of the elbow lever arm 120 about the rotation axle 35 relative to the mounting body 170.

Each pneumatic cylinder 200 generally provides a cylinder portion 201 having a proximal end 202 and a distal end 203. The cylinder portion 201 axially carries a reciprocally movable ram portion 204 in an arrangement wherein the reciprocally movable ram portion 204 is axially enclosed within a bore (not shown) of the cylinder portion 201 when the pneumatic cylinder 200 is in a compressed/retracted state (see FIG. 7), and wherein the reciprocally movable ram portion 204 is axially extended from the bore (not shown) of the cylinder portion 201 when the pneumatic cylinder 200 is in an extended position. (see FIG. 1). Each pneumatic cylinder 200 is internally pressurized, such that the reciprocally movable ram portion 204 is biased to the extended position, (FIG. 1). The cylinder portion 201 carries a pneumatic cylinder socket 208 at the proximal end 202 for engagement with at least one ball mount 181, 182, 183 of the mounting body 170. Similarly, distal end 205 of the reciprocally movable ram portion 204 carries a similar pneumatic cylinder socket 208 for engagement with at least one ball mount 130, 131, 132 of the elbow lever arm 120 second short leg 127. The interconnection of the pneumatic cylinder 200 with the ball mounts 181, 182, 183, 130, 131, 132 allows the pneumatic cylinder 200 to provide mechanical advantage to facilitate and ease pivoting the spa cover 40 from a first position to a second position, and from the second position to the first position.

Figure 6:
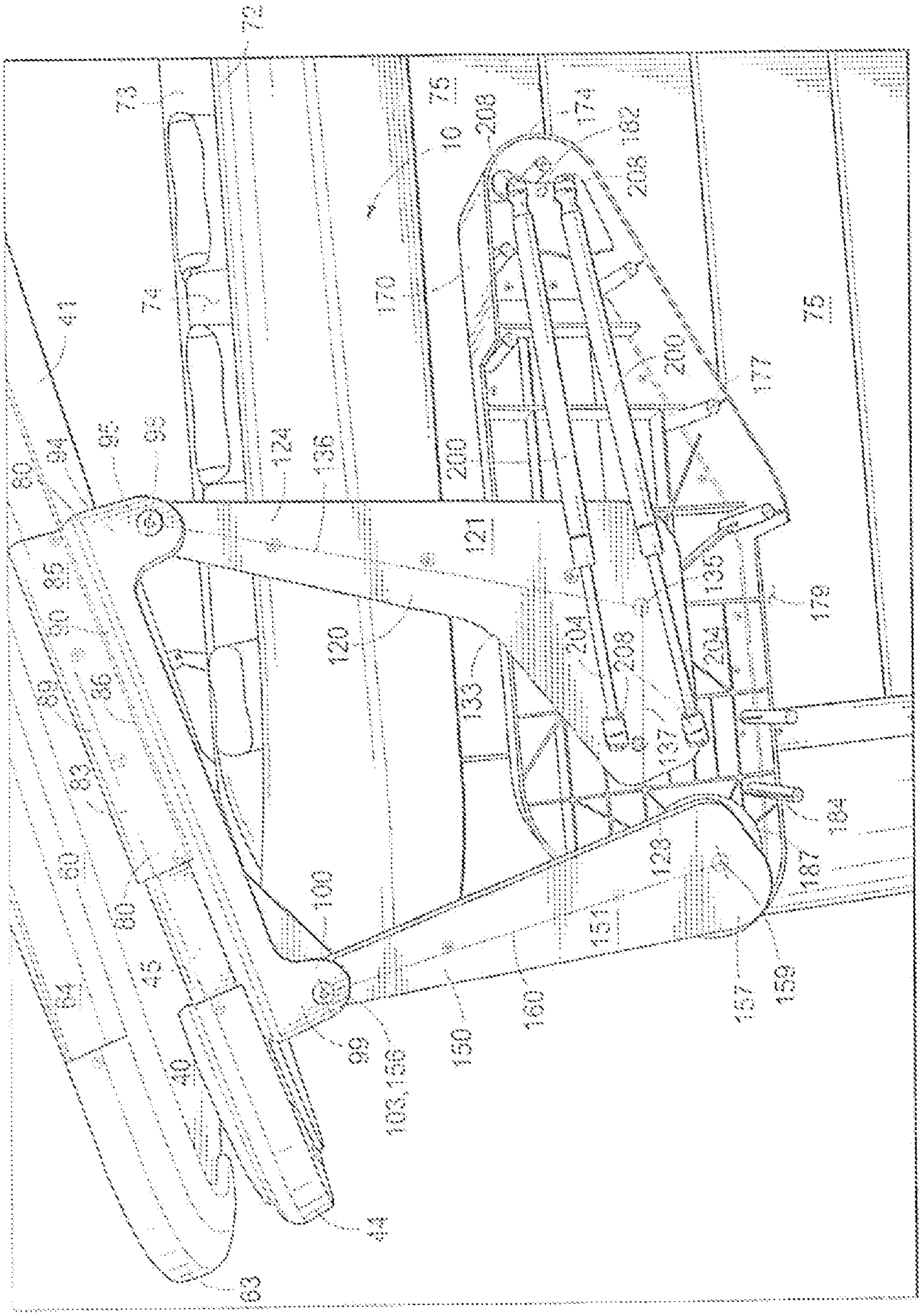
FIG. 6 is a side view of the mounting body showing the elbow lever arm and the control lever arm and the channel bracket attached to the spa cover and in a partially pivoted position relative to the spa opening.

The simultaneous interconnection of the first longer leg 124 of the elbow lever arm 120 with the first pivot yoke 94 of the channel bracket 80, or to the spa cover 40, and the interconnection of the first end 154 of the control lever arm 150 with the second pivot yoke 99 of the channel bracket 80, or to the spa cover 40, causes both the elbow lever arm 120 and the control lever arm 150 to simultaneously pivot about their respective rotation axles 135, 159 relative to the mounting body 170. Further, the simultaneous interconnection of both lever arms 120, 150 with the channel bracket 80, at two spaced apart locations provides a stable and secure mounting location at the lateral peripheral edge 45, 46 of the spa cover 40. Further, as shown in FIGS. 1, 6 and 7 (in the series), as the instant invention 10 and attached spa cover 40 are pivotally moved, the spa cover 40 is simultaneously lifted and translated over, above, and about the upper rearward peripheral edge 72 of the spa body 71.

As shown in FIG. 1, when the spa cover 40 is in the first closed position, the channel bracket 80 extends generally horizontally forwardly and rearwardly relative to the adjacent peripheral edge 72 of the spa body 71, and the first longer leg 124 of the elbow lever arm 120 and the control lever arm 150 extend substantially vertically and somewhat forwardly to facilitate the horizontal orientation of the channel bracket 80. In comparison, as shown in FIG. 7, when the spa cover 40 is in the second open/stowed position the channel bracket 80, and the attached spa cover 40, are both oriented generally vertically and spacedly adjacent to, and parallel to, a rearward generally vertical peripheral edge 75 of the spa body 71. In the second open/stowed position (FIG. 7), the first longer leg 124 of the elbow lever arm 120 extends generally horizontally and toward the rearward peripheral edge 75 of the spa body 71, and the control lever arm 150 extends generally angularly downwardly and rearwardly. Further, as shown in FIG. 7, the stowed spa cover 40 is predominantly vertically below the top peripheral edge 72 of the spa body 71 which defines the spa opening 73. In this stowed position, the spa cover 40 is substantially protected from wind gusts and is less likely to obscure the vision of users sitting within or using the spa.

Figure 7:
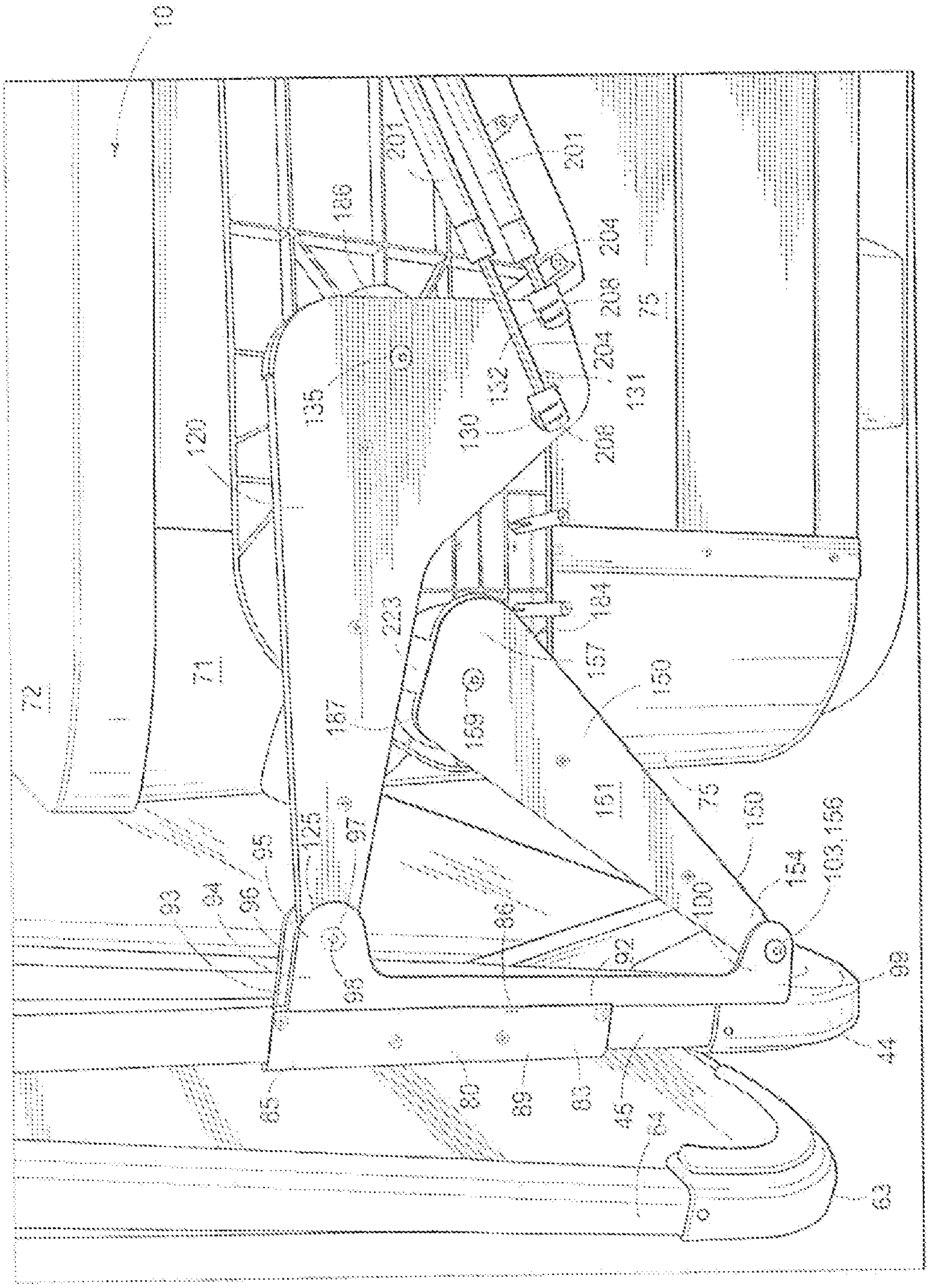
FIG. 7 is a side view similar to that of FIG. 6 showing the attached cover in the second open/stowage position spacedly adjacent to the rearward side portion of the spa body, and the orientation of the elbow lever arm and the control lever arm relative to the channel bracket in the second open/stowage position.
Figure 8:
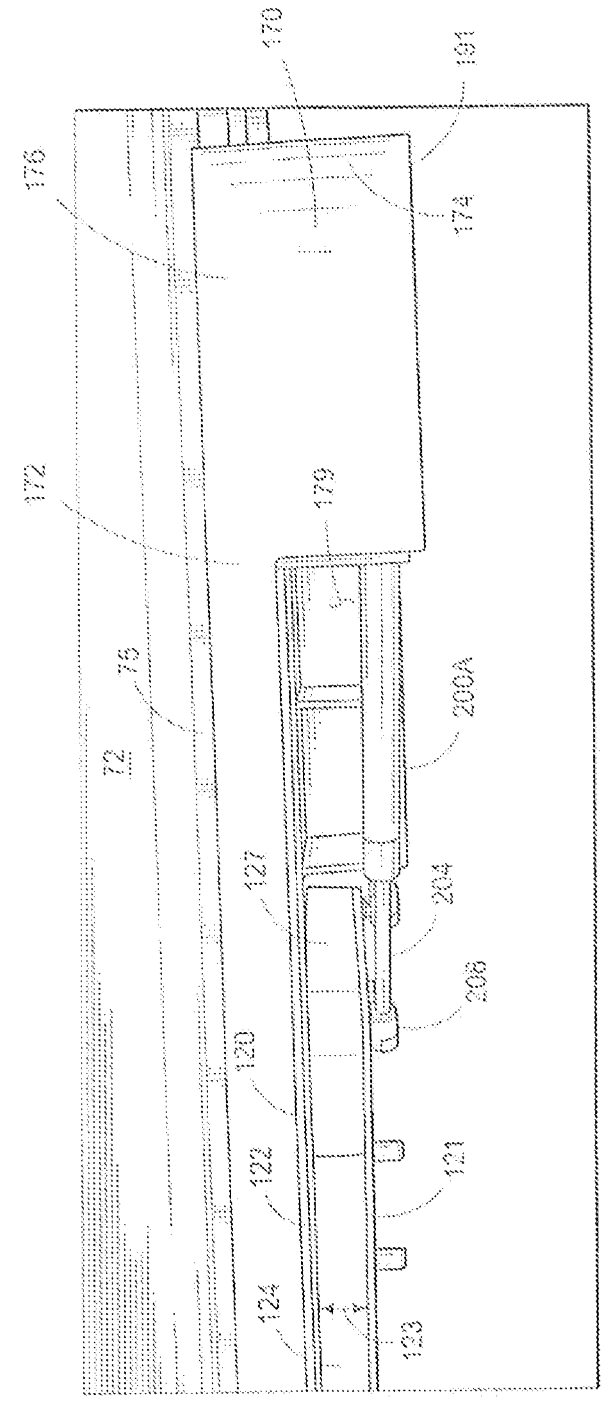
FIG. 8 is a top downwardly looking plan view of the instant invention in the second open/stowage position shown in FIG. 7.

As shown in FIG. 7, a stopper 223 is carried by one of the lever arms 120, 150 and is positioned between the elbow lever arm 120 and an adjacent surface of the control lever arm 150 such that the two lever arms 120, 150 do not directly frictionally contact one another. The stopper 223 functions as a resilient/soft "stop" or "movement limiter" that prevents over-rotation of the spa cover 40 beyond a substantially vertical position adjacent to the spa body 75 and prevents possible damage to the lever arms 120, 150 that might be caused by direct frictional contact therebetween.

Further still, in a second contemplated embodiment, if the first pivot yoke 94 and the second pivot yoke 99 are not aligned in the same vertical plane (i.e. the first pivot yoke 94 is laterally offset from the second pivot yoke 99) the configuration of the rotation axle mounts 186, 187 carried by the mounting body 170, and/or the peripheral configuration of the elbow lever arm 120 and/or control lever arm 150 may be altered to provide an integral "stop" or "movement limiter" that prevents over-rotation of the spa cover 40 beyond a substantially vertical position adjacent to the spa body 75.

The Figures herein show multiple ball mount holes 129 defined in the second short leg 127 of the elbow lever arm 120, and multiple ball mount holes 180 within the interior cavity 173 of the mounting body 170 proximate the first end portion 174 thereof. The location of these respective multiple ball mount holes 129, 180 are predetermined and precisely calculated so as to provide different amounts of mechanical advantage to the elbow lever arm 120 by the pneumatic cylinders 200 because different spa cover 40 configurations, and models, and materials of construction, have differing weights and masses and may require varying amounts of mechanical assistance for movement and stowage. The addition and/or reduction of the number of pneumatic cylinders 200 provides increased/reduced mechanical advantage/biasing to the invention 10. Similarly, the positions of each ball mount 181 182, 183, 130, 131 132 in the respective ball mount holes 129, 180 likewise, and similarly, increases/reduces mechanical advantage/biasing to the invention. Even further still, the alignment of the respective pneumatic cylinders 200 relative to the respective ball mounts 181, 182 183, 130, 131, 132 similarly increases/reduces mechanical advantage/biasing to the invention

Operation

The operation of the described embodiment of the present invention is believed to be readily apparent, and is briefly summarized at this point. In one of its broadest aspects, the present invention relates to a movement assistance and stowage device 10 for a spa cover 40 which may or may not have multiple portions 41, 60 which may or may not be hingedly interconnected, and the spa cover 40 at least partially occludes a spa opening 73 when the spa cover 40 is positioned in a first position relative to the spa opening 73.

As noted previously, it is contemplated the instant invention 10 will be secured to lateral peripheral edges 43, 4, 64, 65 of the spa cover portions 41, 60 and the spa body side walls 75 using mechanical fasteners, and/or with adhesives. Further still, the invention 10 is intended to be installed in pairs one of each, on each lateral peripheral edge 45, 46 of the spa cover 40 and on each opposing lateral side 75 of the spa body 71.

Generally, the spa cover 40 is positioned in a horizontal orientation, such as resting on the top peripheral edge 72 of the spa body 71 occluding the spa opening 73. The spa cover 40 is oriented so that the first lateral peripheral edge 45 of the spa cover 40 and the second lateral peripheral edge 46 of the spa cover 40 are adjacent above, and generally vertically aligned with the adjacent below rigid vertical sidewall 75 of the spa body 71. It is contemplated however, that if pivot yokes 94, 99 are integrated into the spa cover 40, so as to avoid the need to separately attach a channel bracket 80 to the cover, the peripheral edge of the spa cover 40 may extend outwardly of the vertical sidewall 75 of the spa body 71.

A channel bracket 80 is fixedly secured (by known means) to the lateral peripheral edge 45, 46, 64, 65 of the spa cover 40 with the cover edge flange 83 in direct frictional contact with the lateral peripheral edge 45, 46, 64, 65 of the spa cover 40. The first end portion 81 of the channel bracket 80 is oriented toward a hinge peripheral edge 43 of the spa cover 40, and the second end portion 82 of the channel bracket 80 is oriented toward the end peripheral edge 44 of the spa cover 40.

The mounting body 170 carrying the elbow lever arm 120, the control lever arm 150 and at least one pneumatic cylinder 200 within the interior cavity 173 of the mounting body 170 is positioned adjacent one lateral side wall 75 of the spa body 71 spacedly below the top peripheral edge 72 and spacedly adjacent the rearward sidewall 75. The terminal end of the first longer leg 124 of the elbow lever arm 120 is positioned and oriented so that the first pivot axle hole (not shown) defined in the terminal end of the first longer leg 124 is axially aligned with the forward pivot axle holes 97 defined in the first yoke arms 95 of the first pivot yoke 94 of the channel bracket 80, Once the pivot axle holes are aligned, the forward pivot axle 98 is inserted therethrough and secured in place by known means, such as, but not limited to, a threaded fastener, a transversely extending pin, a "C-ring" and/or the like. Thereafter, the first end portion 154 of the control lever arm 150 is similarly positioned and oriented so that the pivot axle hole (not shown) defined in the first end portion 154 of the control lever arm 150 is axially aligned with the rearward axle hole 102 defined in the second yoke arms 100 of the second pivot yoke 99. Once the axial alignment has been established, the rearward pivot axle 103 is inserted therethrough and secured in place by known means. Thereafter, the mounting body 170 is positioned accordingly, and is fixedly secured to the lateral side wall 75 of the spa body 71 with fasteners. (not shown)

The above described process for installation of the invention 10 is repeated for installation/attachment of the invention 10 on the opposing second lateral side 46 of the spa cover 40 and on the opposing sidewall 75 of the spa body 71.

Still further the present invention 10 includes a movement assistance and stowage device 10 for a spa cover 40 having opposing lateral peripheral edges 45, 46, 64, 65 and opposing hinge 62 and end 63 peripheral edges, and wherein the spa cover 40 is movable relative to a spa body 71, from a first position wherein the spa cover 40 at least partially covers/occludes a spa opening 73 defined by the spa body 71, and a second position wherein the spa cover 40 is removed from the spa opening 73 and is stowed at a position spacedly adjacent to and generally parallel to a rearward side portion 75 of the spa body 71, the movement assistance and stowage device 10 comprising a channel bracket 80 secured to a lateral peripheral edge 45, 46, 64, 65 of the spa cover 40 spacedly between the hinge peripheral edge 62 and the end 63 peripheral edge, the channel bracket 80 having, a first end portion 81, a second end portion 82, a top portion 90, two opposing channel side portions 92 extending downwardly from the top portion 90 and defining an interior channel 93 extending between the first end portion 81 and the second end 82 portion, a first pivot yoke 94 at the first end portion 81 and a second pivot yoke 99 at the second end portion 82 with a predetermined length dimension between aligned pivot axle holes 97 defined in yoke arms 95 of the first pivot yoke 94, and aligned pivot axle holes 102 defined in yoke arms 100 of the second pivot yoke 99, and a cover edge flange 83 carried by, and extending generally upwardly from, and parallel to, the top portion 90, and the cover edge flange 83 defines a surface portion that is configured to fixedly engage with the lateral peripheral edge 45, 46, 64, 65 of the spa cover 41, 60 and the cover edge flange 83 defines fastener holes; a mounting body 170 secured to a vertical lateral side portion 75 of the spa body 71 spacedly adjacent a top peripheral edge 72 of the spa body 71 and proximate the rearward side portion 75 of the spa body 71, the mounting body 170 having an outer peripheral edge 171 and defining an interior cavity 173 with an interior mounting surface 172, the mounting body 176 having a first end portion 174, a second end portion 175, a top edge portion 176, and a bottom edge portion 177, the top edge portion 176 and the bottom edge portion 177 each defining gaps 179 to accommodate lever arms 120, 150 to extend therethrough, and the mounting body 170 carries, within the interior cavity 173 an elbow lever arm pivot axle mount 186 at a generally medial position between the first end portion 174 and the second end portion 175, and a control lever arm pivot axle mount 187 at a position proximate to the second end portion 175, the interior cavity 173 further having, proximate the first end portion 174, plural predetermined ball mount locations 180 for a first ball mount 181, a second ball mount 182 and a third ball mount 183; an elbow lever arm 120 pivotally carried at least partially within the interior cavity 173 of the mounting body 170, the elbow lever arm 120 having a first longer leg 124 and a second short leg 127, and the second short leg 127 is angularly disposed relative to the first longer leg 124 at an angle/elbow 133 therebetween, the first longer leg 124 and the second short leg 127 each having a terminal end portion, opposite the angle/elbow 133 and the first longer leg 124 defines a pivot axle hole 126 proximate the terminal end portion, the elbow lever arm 120 further having a first exterior lateral surface 121 and a second interior lateral surface with a thickness 123 dimension therebetween, and the first longer leg 124 at least partially extends through the gap 179 defined in the mounting body 170 peripheral edge 171 and is pivotally journaled by the first pivot yoke 94 of the channel bracket 80 on forward pivot axle 98 extending therethrough, the elbow lever arm 120 further defining a rotation axle hole 134 extending through the thickness dimension 123 at a position proximate to the angle/elbow 133 for a rotation axle 138 that engages with the elbow lever arm pivot axle mount 186 within the mounting body 170 interior cavity 173, and the first exterior lateral surface 121 of the second short leg 127 defines plural predetermined ball mount locations 129 proximate to the terminal end portion 128 thereof, for a first ball mount 130, a second ball mount 131 and a third ball mount 132; a control lever arm 150 pivotally carried partially within the interior cavity 173 of the mounting body 170 the control lever arm 150 is elongate and has a first end portion 154 and a second end portion 157, and each end portion defines a pivot axle hole 155, 158 respectively proximate the terminal end portion, the control lever arm 150 further having a first exterior lateral surface 151 and a second interior lateral surface 152 with a thickness dimension 153 therebetween, and the first end portion 154 at least partially extends through the gap 179 defined in the mounting body 170 peripheral edge 171 and is pivotally journaled by the second pivot yoke 99 of the channel bracket 80 on a rearward pivot axle 103 extending therethrough, and the second end portion 157 is pivotally interconnected with the control lever arm pivot axle mount 187 within the interior cavity 173 of the mounting body 70 with a pivot axle 159 extending therethrough; and two pneumatic cylinders 200 which extend between and are pivotally interconnected with the ball mounts 181, 182, 183 carried within the interior cavity 173 of the mounting body 170 and at the first end portion 174 thereof, and with the ball mounts 139, 131, 132 carried on the lateral exterior facing surface 121 of the second'short leg 127 of the elbow lever control arm 120, and the pneumatic cylinders 200 mechanically cooperate with the spa cover 40 through the channel bracket 80, and the elbow lever arm 120, and the control lever arm 150, and the mounting body 170 secured to the spa body 71 side portion 75 to assist in the movement of the spa cover 40 from the first position wherein the spa cover 40 at least partially occludes the spa opening 73, to the second position wherein the spa cover 40 is stowed spacedly adjacent to, and generally parallel to, the vertical rearward side portion 75 of the spa body 71 and wherein the stowed spa cover 40 is positioned at least partially vertically below the top peripheral edge 72 of the spa body 71 that defines the spa opening 73, and wherein the pneumatic cylinders 200, the channel bracket 80, the lever arms 120, 150 and the mounting body 170 further assist in the return of the spa cover 40 back to the first position relative to the spa body 71 which at least partially occludes the spa opening 73.

The present invention is a movement assistance and stowage device 10 for a spa cover 40 wherein the spa cover 40 is movable, relative to a spa body 71, between a first position at least partially occluding a spa opening 73, and a second position wherein the spa cover 40 is removed from the spa opening 73 and is stowed adjacent to a side portion 75 of the spa body 71, the movement assistance and stowage device comprising a mounting body 170 secured to the spa body 71, the mounting body 170 having an elbow lever arm mount 186, a control lever arm mount 187, and a ball mount 181; an elbow lever arm 120 pivotally carried on the elbow lever arm mount 186, the elbow lever arm 120 having a first leg 124 and a second leg 127, and one leg 124, 127 is angularly disposed relative to the other leg 127, 124, and the first leg 124 has an end portion opposite the second leg 127, and the end portion of the first leg 124 is pivotally interconnected to the spa cover 40, and the second leg 127 carries a ball mount 130 proximate an end portion opposite the first leg 124; a control lever arm 150 pivotally carried on the control lever arm mount 187. the control lever arm 150 having an end portion 157 opposite the control lever arm pivot axle mount 187 that pivotally interconnects with the spa cover 40; and a biasing cylinder 200 communicating between, and pivotally interconnected with the ball mount 181 carried by the mounting body 170, and the ball mount 130 carried by the elbow lever control arm 120.

A movement assistance and stowage device for a spa cover further comprising a channel bracket 80 secured to a lateral peripheral edge 45, 46, 64, 65 of the spa cover 40, the channel bracket 80 having, a first pivot yoke 94 at a first end portion 81 and a second pivot yoke 99 at a second end portion 82, each pivot yoke 94, 99 defining aligned pivot axle holes 97, 102; and the first end portion of the first longer leg 124 of the elbow lever control arm 120 pivotally interconnects with the first pivot yoke 94, and the end portion of the control lever arm 150, opposite the control lever arm pivot axle mount 187, pivotally interconnects with the second pivot yoke 99.

A movement assistance and stowage device for a spa cover further comprising a rotation limiter/stopper 223 carried by one of the elbow lever control arm 120, or the control lever arm 150, to prevent the elbow lever control arm 120 and the control lever arm 150 from directly frictionally contacting one another when the spa cover 40 is in the second position.

A movement assistance and stowage device for a spa cover wherein the biasing cylinder 200 mechanically cooperates with the spa over 40 through the elbow lever arm 120, and the control lever arm 150, and the mounting body 170 secured to the spa body 71 to assist in the movement of the spa cover 40 from the first position wherein the spa cover 40 at least partially occludes the spa opening 73, to the second position wherein the spa cover 40 is stowed adjacent and generally parallel to a rearward side portion 75 of the spa body 71 and wherein the stowed spa cover 40 is at least partially vertically below an upper peripheral edge 72 of the spa body 71 that defines the spa opening 73, and wherein the biasing cylinder 200, the lever arms 120, 150 and the mounting body 170 further assist in the return of the spa cover 40 from the second position back to the first position relative to the spa body 71 wherein the spa cover 40 at least partially occludes the spa opening 73.

A movement assistance and stowage device 10 for a spa cover 40 having opposing lateral peripheral edges 45, 46, 64, 65, and wherein the spa cover 40 is movable relative to a spa body 71, between a first position wherein the spa cover 40 at least partially covers/occludes a spa opening 73 defined by the spa body 71, and a second position wherein the spa cover 40 is removed from the spa opening 73 and is stowed at a position adjacent to a side portion 75 of the spa body 71, the movement assistance and stowage device comprising a channel bracket 80 secured to a lateral peripheral edge 45, 46, 64, 66 of the spa cover 40, the channel bracket 80 having, a first pivot yoke 94 at a first end portion 81 and a second pivot yoke 99 at a second end portion 82, each pivot yoke 94, 99 defining aligned pivot axle holes 98, 102; a mounting body 170 secured to the spa body 71, the mounting body 170 having, a first end portion 174, a second, end portion 175, an elbow lever arm pivot axle mount 186, a control lever arm pivot axle mount 187, at least one predetermined ball mount location 180, and at least one ball mount 181 in the at least one predetermined ball mount location 180: an elbow lever arm 120 pivotally carried on a pivot axle 135 engaged with the elbow lever arm pivot axle mount 186, the elbow lever arm 120 having, a first leg 124 and a second leg 127, and the second leg 127 is angularly disposed relative to the first leg 124, and the first leg 124 defines a pivot axle hole proximate an end portion opposite the second leg 127, and the pivot axle hole carries a pivot axle 98 that is journaled by the first pivot yoke 94 of the channel bracket 80 so that the first leg 124 is pivotally interconnected with the channel bracket 80, and the second leg 127 defines a predetermined ball mount location 129, and at least one ball mount 130 in the ball mount location 129 proximate an end portion opposite the first leg 124; a control lever arm 150 pivotally carried on a pivot axle 159 engaged with the control lever arm pivot axle mount 187, the control lever arm 150 is elongate and has a first end portion 154 and a second end portion 157 and each end portion 154, 157 defines a pivot axle hole 155, 158, and the pivot axle hole 155 defined in the first end portion 154 carries a pivot axle 156 that is pivotally journaled by the second pivot yoke 99 of the channel bracket 80 so that the first end 154 is pivotally interconnected with the channel bracket 80, and the pivot axle hole 158 defined in the second end portion 157 carries a pivot axle 159 that engages with the control lever arm pivot axle mount 187 carried by the mounting body 170; and a pneumatic cylinder 200 communicating between, and pivotally interconnected with the at least one ball mount 181 carried by the mounting body 170, and with the at least one ball mount 130 carried by the second leg of the elbow lever control arm 120.

A movement assistance and stowage device for a spa cover further comprising a second ball mount 182 carried by the mounting body 170 in a second predetermined precise ball mount location 180 thereon; a second ball mount 131 carried by the elbow lever control art 120 in a second predetermined precise ball mount location 129 thereon proximate the end portion of the second leg 127; and a second pneumatic cylinder 200 communicating between the second ball mount 182 carried by the mounting body 170 and the second ball mount 131 carried by the elbow lever control arm 120.

A movement assistance and stowage device for a spa cover wherein the channel bracket 80 is positionally secured to a lateral peripheral edge 45, 46, 64, 65 of the spa cover 40 spacedly between a hinge peripheral edge 43 and an end peripheral edge 44. and the channel bracket 80 has a first end portion 81 a second end portion 82, a top portion 90, channel side portions 92 extending downwardly from the top portion 90 and defining an interior channel 93 extending between the first end portion 81 and the second end portion 82, and a predetermined length dimension between aligned pivot axle holes 98, defined in yoke arms 95, of the first pivot yoke, an 04d aligned pivot axle holes 102 defined in yoke arms 100 of the second pivot yoke 99, and a cover edge flange 83 carried by, and extending generally upwardly from, and parallel to, the top portion 90, and the cover edge flange 83 defines a surface portion that is configured to fixedly engage with the lateral peripheral edge 45, 46, 64, 65 of the spa cover 40 and the cover edge flange 83 defines fastener holes.

A movement assistance and stowage device for a spa cover wherein the mounting body 170 is secured to a vertical lateral side portion 75 of the spa body 71 spacedly adjacent a top edge 72 of the spa body 71 and proximate a rearward side portion 75 of the spa body 71, and the mounting body 170 has, an outer peripheral edge 171 and defines an interior cavity 173 with an interior mounting surface 172, the body 170 further having a top edge portion 176, and a bottom edge portion 177, and the top edge portion 176 defines a gap 170 to permit the lever arm 120, 150 to extend therethrough; and the elbow lever arm pivot axle mount 186 is at a generally medial position between the first end portion 174 and the second end portion 175; and the control lever arm pivot axle mount 187 is proximate the second end portion 175 of the mounting body 170; and the interior cavity 13 defines proximate the first end portion 174, plural predetermined ball mount locations 180 for at least a first ball mount 181 and second ball mount 182.

A movement assistance and stowage device for a spa cover 40 and wherein the elbow lever arm 120 is pivotally carried on a pivot axle 135 engaged with the elbow lever arm pivot axle mount 186 and is carried at least partially within the interior cavity 173 of the mounting body 170, the elbow lever arm 120 having, a body with a first longer leg 124 and a second short leg 127, and the second short leg 127 is angularly disposed relative to the first longer leg 124 at an angle/elbow 133 therebetween, the first longer leg 124 and the second short leg 127 each having a terminal end portion 128 opposite the angle/elbow 133 and the first longer leg 124 defines a pivot axle hole proximate the terminal end portion, and the first leg 124 at, least partially extends through the gap 179 defined in the mounting body peripheral edge 171 and a pivot axle 98 carried in the pivot axle hole is pivotally journaled by the first pivot yoke 94 of the channel bracket 80, the elbow lever arm body 120 further defining a rotation axle hole 134 at a position proximate the angle/elbow 133 for a rotation axle 135 that engages with the elbow lever arm pivot axle mount 186 within the mounting body interior cavity 171, and the second short leg 127 defines plural predetermined ball mount locations 129 proximate an end portion 128 opposite the angle/elbow 133 for at least a first ball mount 130, and a second ball mount 131.

A movement assistance and stowage device for a spa cover 40 and wherein the control lever arm 150 is pivotally carried on a pivot axle 159 engaged with the control lever arm pivot axle mount 187, and is carried at least partially within the interior cavity 171 of the mounting body 170, the control lever arm 150 is elongate and has a first end portion 154 and a second end portion 157, each of the first end portion 154 and the second end portion 157 has a terminal end, and each end portion 154, 157 defines a pivot axle hole 155, 158 proximate the terminal end, and the first end portion 154 at least partially extends through a gap 179 defined in the mounting body peripheral edge 171 and the first end portion 154 of the control lever arm 150 is pivotally interconnected to the second pivot yoke 99 of the channel bracket 80 on a pivot axle 156 extending therethrough, and the second end portion 157 of the control lever arm 150 is pivotally interconnected with the control lever arm pivot axle mount 187 of the mounting body 170 within the interior cavity 173 of the mounting body 170 with a pivot axle 159 extending therethrough.

A movement assistance and stowage device for a spa cover 40 and wherein the pneumatic cylinder mechanically 200 cooperates with the spa cover 40 through the channel bracket 80, and the elbow lever arm 120, and the control lever arm 150, and the mounting body 170 secured to the spa body 71 side portion 75 to assist in the movement of the spa cover 40 from the first position wherein the spa cover 40 at least partially occludes the spa opening 73, to the second position wherein the spa cover 40 is stowed adjacent and generally parallel to the rearward side portion 75 of the spa body 71 and wherein the stowed spa cover 40 is at least partially vertically below the upper peripheral edge 72 of the spa body 71 that defines the spa opening 73, and wherein the pneumatic cylinder 200, the channel bracket 80, the lever arms 120, 150 and the mounting body 170 further assist in the return of the spa cover 40 from the second position back to the first position relative to the spa body 71 wherein the spa cover 40 at least partially occludes the spa opening 73.

A movement assistance and stowage device for a spa cover 40 having opposing lateral peripheral edges 45, 46, 64, 65 and opposing hinge 43, 62 and end peripheral edges 44, 63, and wherein the spa cover 40 is movable relative to a spa body 71, from a first position wherein the spa cover 40 at least partially covers/occludes a spa opening 73 defined by the spa body 71, and a second stowed position wherein the spa cover 40 is removed from the spa opening 73 and is stowed at a position adjacent to and generally parallel to a rearward side portion 75 of the spa body 71, the movement assistance and stowage device 10 comprising: a channel bracket 80 secured to a lateral peripheral edge 45, 46, 64, 65 of the spa cover 40 spacedly between the hinge peripheral edge 43, 62 and the end peripheral edge 44, 63, the channel bracket 80 having, a first end portion 81, a second end portion 82, a top portion 90, channel side portions 92 extending downwardly from the top portion 90 and defining an interior channel 93 extending between the first end portion 81 and the second end portion 82, a first pivot yoke 94 at the first end portion 81 and a second pivot yoke 99 at the second end portion 82 with a predetermined length dimension between aligned pivot axle holes 97 defined yoke arms 95 of the first pivot yoke 94, and aligned pivot axle holes 102 defined in yoke arms 100 of the second pivot yoke 99, and a cover edge flange 83 carried by, and extending generally upwardly from, and parallel to, the top portion 90, and the cover edge flange 83 defines a surface portion that is configured to fixedly engage with the lateral peripheral edge 45, 46, 64, 65 of the spa cover 40 and the cover edge 83 flange defines fastener holes: a mounting body 170 secured to a vertical lateral side portion 75 of the spa body 71 spacedly adjacent a top peripheral edge 72 of the spa body 71 and proximate the rearward side portion 75 of the spa body 71, the mounting body 170 having an outer peripheral edge 171 and defining an interior cavity 1723with an interior mounting surface 172, the main body having a first end portion 174, a second end portion 175, a top edge portion 176, and a bottom edge portion 177, the top edge portion 176 and the bottom edge portion 177 each define a gap 179 to permit to the lever arms 120, 150 to extend at least partially therethrough, and the mounting body 170 carries, within the interior cavity 173 an elbow lever arm pivot axle mount 186 at a generally medial position between the first end portion 174 and the second end portion 178, and a control lever arm pivot axle mount 187 at a position proximate to the second end portion 175 the interior cavity 173 further having, proximate the first end portion 174, plural predetermined ball mount locations 180 for a first ball mount 181, a second ball mount 182 and a third ball mount 183; an elbow lever arm 120 pivotally carried at least partially within the interior cavity 173 of the mounting body 170, the elbow lever arm 120 having a first longer leg 124 and a second short leg 127, and the second short leg 127 is angularly disposed relative to the first longer leg 124 at an angle/elbow 133 therebetween, the first longer leg 124 and the second short leg 127 each having a terminal end portion opposite the angle/elbow 133 and the first longer leg 124 defines a pivot axle hole proximate the terminal end portion, the elbow lever arm 120 further having a first exterior lateral surface 121 and a second interior lateral surface with a thickness dimension 123 therebetween, and the first longer leg 124 at least partially extends through the gap 179 defined in the mounting body peripheral edge 171 and is pivotally journaled by the first pivot yoke 94 of the channel bracket 80 on a pivot axle 98 extending therethrough, the elbow lever arm further defining a rotation axle hole 134 extending through the thickness dimension 123 at a position proximate to the angle/elbow 133 for a rotation axle 135 that engages with the elbow lever arm pivot axle mount 186 within the mounting body interior cavity 173, and the first exterior lateral surface 121 of the second short leg 127 defines plural predetermined ball mount locations 129 proximate to the terminal end portion 128 thereof, for a first ball mount 130, a second ball mount 131 and a third ball mount 132; a control lever arm 150 pivotally carried partially within the interior cavity 173 of the mounting body 170, the control lever arm 150 is elongate and has a first end portion 174 and a second end portion 175, the first end portion 174 and the second end portion 175 each define a pivot axle hole 155, 158 proximate a terminal end portion, the control lever arm 150 further having a first exterior lateral surface 151 and a second interior lateral surface 152 with a thickness dimension 153 therebetween, and the first end portion 154 at least partially extends through the gap 179 defined in the mounting body peripheral edge 171 and is pivotally journaled by the second pivot yoke 99 of the channel bracket 80 on a pivot axle 166 extending therethrough, and the second end portion 157 is pivotally interconnected with the control lever arm pivot axle mount 187 within the interior cavity 173 of the mounting body 170 with a pivot axle 159 extending therethrough; and two pneumatic cylinders 200 which extend between and are pivotally interconnected with the ball mounts 181, 182, 183 carried within the interior cavity 173 of the mounting body 170 and at the first end 174 thereof, and with the ball mounts 130, 131, 132 carried on the lateral exterior facing surface 151 of the second leg 127 of the elbow lever control arm 120, and the pneumatic cylinders 200 mechanically cooperate with the spa cover 40 through the channel bracket 80 and the elbow lever arm 120 and the control lever arm 150 and the mounting body 170 secured to the spa body side portion 75 to assist in the movement of the spa cover 40 from the first position wherein the spa cover 40 at least partially occludes the spa opening 73, to the second position wherein the spa cover 40 is stowed adjacent and generally parallel to the rearward side portion 75 of the spa body 71 and wherein the stowed spa cover 40 is positioned at least partially vertically below the upper peripheral edge 72 of the spa body 71 that defines the spa opening 73 and wherein the pneumatic cylinders 200, the channel bracket 80, the lever arms 120, 150 and the mounting body 170 further assist in the return of the spa cover 40 back to the first position relative to the spa body 71 which at least partially occludes the spa opening 73.

A movement assistance and stowage device 10 for a spa cover 40 wherein the spa cover 40 is movable, relative to a spa body 71, between a first position at least partially occluding a spa opening 73, and a second position wherein the spa cover 40 is removed from the spa opening 73 and is stowed adjacent to a side portion 75 of the spa body 71, the movement assistance and stowage device 10 comprising a mounting body 170 secured to the spa body 71, the mounting body 170 having an elbow lever arm mount 186, a control lever arm mount 187, and a ball mount 181; an elbow lever arm 120 pivotally carried on the elbow lever arm mount 186, the elbow lever arm 120 having a first leg 124 and a second leg 127, and the first leg 124 is angularly disposed relative to the second leg 127 and the first leg 124 has an end portion opposite the second leg 127, and the end portion of the first leg 124 is pivotally interconnected to the spa cover 40, and the second leg 127 carries a ball mount 130 proximate an end portion opposite the first leg 124; a control lever arm 150 pivotally carried on the control lever arm pivot axle mount 187, the control lever arm 150 having an end portion opposite the control lever arm pivot axle mount 187 that pivotally interconnects with the spa cover 40; and a biasing cylinder 200 communicating between, and pivotally interconnected with the ball mount 181 carried by the mounting body 170, and the ball mount 130 carried by the elbow lever control arm 120.

A movement assistance and stowage device 10 for a spa cover 40 wherein the spa cover 40 is movable, relative to a spa body 71, between a first position at least partially occluding a spa opening 73 and a second position wherein the spa cover 40 is removed from the spa opening 73 and is stowed adjacent to a side portion 75 of the spa body 71 and a hinge peripheral edge 62 of the spa cover 40 when the spa cover 40 is in the second open/stowage position, is coplanar with a top peripheral edge 72 of the spa body 71.

Therefore, it will be seen that the present invention 10 provides a convenient means whereby a user, with the exertion of minimal physical force or energy may open a spa cover 40 in an easy and simple manner not possible, heretofore. The present invention 10 is rather simple in its construction, controls the movement of the spa cover 40, and further prevents the spa cover 40 from moving in an uncontrollable fashion so as to avoid damage to either the spa 70 or spa cover 40, or harm to the user. The present invention further inhibits a user from struggling to open either a large spa cover40, or one that might be covered with snow or ice. As should be understood, the present invention could further include selectively actuatable air cylinders (not shown) which would be used in place of the pneumatic cylinders 200 as previously described. In this alternative embodiment (not shown) a small air compressor would be selectively coupled to the respective air cylinders, and an electric controller would selectively control the delivery of the compressed air to the respective air cylinders in a controlled manner so as to effect the opening and closing of the spa cover 40.

In compliance with the statutes, laws and treaties, the invention has been described in language more or less specific as to structural and methodical features. It is to be understood, however, that the invention is not limited to the specific features shown or described since the means herein disclose comprised preferred forms of putting the invention into effect. The invention is therefore claimed in any of its forms or modifications, within the proper scope of the appended claims, appropriately interpreted in accordance with the doctrine of equivalence

I claim:

1. A movement assistance and stowage device for a spa cover having opposing lateral peripheral edges, and wherein the spa cover is movable relative to a spa body, between a first position wherein the spa cover at least partially covers/occludes a spa opening defined by the spa body, and a second position wherein the spa cover is removed from the spa opening and is stowed at a position adjacent to a side portion of the spa body, the movement assistance and stowage device comprising:

a channel bracket secured to a lateral peripheral edge of the spa cover, the channel bracket having, a first pivot yoke at a first end portion and a second pivot yoke at a second end portion, each pivot yoke defining a pivot axle hole;

a mounting body secured to the spa body, the mounting body having, a first end portion, a second end portion, an elbow lever arm pivot axle mount, a control lever arm pivot axle mount, and a ball mount in a predetermined ball mount location;

an elbow lever arm pivotally carried on a pivot axle engaged with the elbow lever arm pivot axle mount, the elbow lever arm having, a first leg and a second leg, and the second leg is angularly disposed relative to the first leg, and the first leg defines a pivot axle hole proximate an end portion opposite the second leg, and the first leg pivot axle hole carries a pivot axle that is journaled by the first pivot yoke of the channel bracket so that the first leg is pivotally interconnected with the channel bracket, and the second leg defines a predetermined ball mount location proximate an end portion of the second leg opposite the first leg, and the second leg carries a ball mount in the predetermined ball mount location of the second leg;

a control lever arm pivotally carried on a pivot axle engaged with the control lever arm pivot axle mount, the control lever arm having a first end portion and a second end portion, each of the first and second end portions defining a pivot axle hole, and the pivot axle hole defined in the first end portion of the control lever arm carries a pivot axle that is pivotally journaled by the second pivot yoke of the channel bracket so that the first end portion of the control lever arm is pivotally interconnected with the channel bracket, and the pivot axle hole defined in the second end portion of the control lever arm carries a pivot axle that engages with the control lever arm pivot axle mount carried by the mounting body; and a pneumatic cylinder communicating between, and pivotally interconnected with the ball mount carried by the mounting body, and with the ball mount carried by the elbow lever control arm; and a second ball mount carried by the mounting body at a second predetermined ball mount location thereon;

a second ball mount carried by the elbow lever control arm at a second predetermined ball mount location thereon proximate the end portion of the second leg; and a second pneumatic cylinder communicating between the second ball mount carried by the mounting body and the second ball mount carried by the elbow lever control arm.

2. The movement assistance and stowage device for a spa cover of claim 1 and wherein the channel bracket is secured to a lateral peripheral edge of the spa cover spacedly between a hinge peripheral edge and an end peripheral edge, and the channel bracket has a first end portion, a second end portion, a top portion, channel side portions extending downwardly from the top portion and defining an interior channel extending between the first end portion and the second end portion, and a predetermined length dimension between aligned pivot axle holes defined in yoke arms of the first pivot yoke, and aligned pivot axle holes defined in yoke arms of the second pivot yoke, and a cover edge flange carried by, and extending upwardly from, and parallel to, the top portion, and the cover edge flange defines a surface portion that is configured to fixedly engage with the lateral peripheral edge of the spa cover and the cover edge flange defines fastener holes.

3. The movement assistance and stowage device for a spa cover of claim 1 and wherein the mounting body is secured to a vertical lateral side portion of the spa body spacedly adjacent a top edge of the spa body and proximate a rearward side portion of the spa body, and the mounting body has, an outer peripheral edge and defines an interior cavity with an interior mounting surface, the mounting body further having a top edge portion, and a bottom edge portion, and the top edge portion defines a gap to permit portions of the elbow lever arm, and the control lever arm to extend therethrough, and the elbow lever arm pivot axle mount is at a position between the first end portion and the second end portion of the mounting body; and the control lever arm pivot axle mount is proximate the second end portion of the mounting body; and the interior cavity of the mounting body defines, proximate the first end portion of the mounting body, plural predetermined ball mount locations each for a ball mount.

4. The movement assistance and stowage device for a spa cover of claim 3 and wherein the elbow lever arm is pivotally carried on a pivot axle engaged with the elbow lever arm pivot axle mount and the elbow lever arm is carried at least partially within the interior cavity of the mounting body, and wherein the elbow lever arm first leg is a first longer leg and the elbow lever arm second leg is a second short leg, and the second short leg is angularly disposed relative to the first longer leg at an angle/elbow therebetween, the first longer leg and the second short leg each having a terminal end portion opposite the angle/elbow and the first longer leg defines a pivot axle hole proximate the terminal end portion, and the first longer leg at least partially extends through the gap defined in the mounting body peripheral edge and a pivot axle carried in the pivot axle hole is pivotally journaled by the first pivot yoke of the channel bracket, the elbow lever arm further defining a rotation axle hole at a position proximate the angle/elbow for a rotation axle that engages with the elbow lever arm pivot axle mount within the mounting body interior cavity, and the second leg defines a predetermined ball mount location is located proximate an end portion of the second short leg and spaced apart from the angle/elbow of the elbow lever arm, and the ball mount is carried in the second leg predetermined ball mount location.

5. The movement assistance and stowage device for a spa cover of claim 3 and wherein the control lever arm is pivotally carried on a pivot axle engaged with the control lever arm pivot axle mount, and is carried at least partially within the interior cavity of the mounting body, the control lever arm having a first end portion and a second end portion, each of the first end portion and the second end portion defining a pivot axle hole proximate a terminal end portion, and the first end portion at least partially extends through a gap defined in the mounting body peripheral edge and the first end portion of the control lever arm is pivotally interconnected to the second pivot yoke of the channel bracket on a pivot axle extending therethrough, and the second end portion of the control lever arm is pivotally interconnected with the control lever arm pivot axle mount of the mounting body within the interior cavity of the mounting body with a pivot axle extending therethrough.

6. The movement assistance and stowage device for a spa cover of claim 1 and further comprising:

a rotation limiter/stopper carried by one of the elbow lever control arm, or the control lever arm, to prevent the elbow lever control arm and the control lever arm from directly frictionally contacting one another when the spa cover is in the second position.

7. The movement assistance and stowage device for a spa cover of claim 1 and wherein the pneumatic cylinder mechanically cooperates with the spa cover through the channel bracket, and the elbow lever arm, and the control lever arm, and the mounting body secured to the spa body side portion to assist in the movement of the spa cover from the first position wherein the spa cover at least partially occludes the spa opening, to the second position wherein the spa cover is stowed adjacent to and parallel to the rearward side portion of the spa body and wherein the stowed spa cover is at least partially vertically below the upper peripheral edge of the spa body that defines the spa opening, and wherein the pneumatic cylinder, the channel bracket, the lever arms and the mounting body further assist in the return of the spa cover from the second position back to the first position relative to the spa body wherein the spa cover at least partially occludes the spa opening.

8. A movement assistance and stowage device for a spa cover having opposing lateral peripheral edges and opposing forward and rearward peripheral edges, and wherein the spa cover is movable relative to a spa body, from a first position wherein the spa cover at least partially covers/occludes a spa opening defined by the spa body, and a second stowed position wherein the spa cover is removed from the spa opening and is stowed at a position adjacent to and parallel to a rearward side portion of the spa body, the movement assistance and stowage device comprising:

a channel bracket secured to a lateral peripheral edge of the spa cover spacedly between the forward peripheral edge and the rearward peripheral edge, the channel bracket having, a first end portion, a second end portion, a top portion, two opposing channel side portions extending downwardly from the top portion and defining an interior channel extending between the first end portion and the second end portion, a first pivot yoke at the first end portion and a second pivot yoke at the second end portion with a predetermined length dimension between aligned pivot axle holes defined in yoke arms of the first pivot yoke, and aligned pivot axle holes defined in yoke arms of the second pivot yoke, and a cover edge flange carried by, and extending generally upwardly from, and parallel to, the top portion, and the cover edge flange defines a surface portion that is configured to fixedly engage with the lateral peripheral edge of the spa cover and the cover edge flange defines fastener holes;

a mounting body secured to a vertical lateral side portion of the spa body spacedly adjacent a top peripheral edge of the spa body and proximate the rearward side portion of the spa body, the mounting body having, a main body having an outer peripheral edge and defining an interior cavity with an interior mounting surface, the main body having a first end portion, a second end portion, a top edge portion, and a bottom edge portion, the top edge portion and the bottom edge portion each defining gaps to accommodate lever arms to extend therethrough, and the main body carries, within the interior cavity an elbow lever arm pivot axle mount at a position between the first end portion and the second end portion, and a control lever arm pivot axle mount at a position proximate to the second end portion, the interior cavity further having, proximate the first end portion, predetermined ball mount locations for a first ball mount, a second ball mount and a third ball mount;

an elbow lever arm pivotally carried at least partially within the interior cavity of the mounting body, the elbow lever arm having, a first longer leg and a second short leg, and the second short leg is angularly disposed relative to the first longer leg at an angle/elbow therebetween, the first longer leg and the second short leg each having a terminal end portion opposite the angle/elbow and the first longer leg defines a pivot axle hole proximate the terminal end portion, the body further having a first exterior lateral surface and a second interior lateral surface with a thickness dimension therebetween, and the first leg at least partially extends through the gap defined in the mounting body peripheral edge and is pivotally journaled by the first pivot yoke of the channel bracket on a pivot axle extending therethrough, the elbow lever arm body further defining a rotation axle hole extending through the thickness dimension at a position proximate to the angle/elbow for a rotation axle that engages with the elbow lever arm pivot axle mount within the mounting body interior cavity, and the first exterior lateral surface of the second short leg defines predetermined ball mount locations proximate to the terminal end portion thereof, for a first ball mount, a second ball mount and a third ball mount;

a control lever arm pivotally carried at least partially within the interior cavity of the mounting body, the control lever arm having, a first end portion and a second end portion, the first end portion and the second end portion each having a terminal end and each end portion defines a pivot axle hole, the control lever arm further having a first exterior lateral surface and a second interior lateral surface with a thickness dimension therebetween, and the first end portion at least partially extends through the gap defined in the mounting body peripheral edge and is pivotally journaled by the second pivot yoke of the channel bracket on a pivot axle extending therethrough, and the second end portion is pivotally interconnected with the control lever arm pivot axle mount within the interior cavity of the mounting body with a pivot axle extending therethrough: and pneumatic cylinders which extend between and are pivotally interconnected with the ball mounts carried within the interior cavity of the mounting body and at the first end thereof, and with the ball mounts carried on the lateral exterior facing surface of the second end of the elbow lever control arm, and the pneumatic cylinders mechanically cooperate with the spa cover through the channel bracket and the elbow lever arm and the control lever arm and the mounting body secured to the spa body side portion to assist in the movement of the spa cover from the first position wherein the spa cover at least partially occludes the spa opening, to the second stowed position wherein the spa cover is stowed adjacent to and parallel to the rearward side portion of the spa body and wherein the stowed spa cover is positioned at least partially vertically below the upper peripheral edge of the spa body that defines the spa opening, and wherein the pneumatic cylinders, the channel bracket, the lever arms and the mounting body further assist in the return of the spa cover back to the first position relative to the spa body which at least partially occludes the spa opening.

9. The movement assistance and stowage device for a spa cover of claim 8 and further comprising:

a rotation limiter/stopper carried by one of the elbow lever control arm, or the control lever arm, to prevent the elbow lever control arm and the control lever arm from directly frictionally contacting one another when the spa cover is in the second position.

* * * * *